US012650405B2

(12) United States Patent
Harraz et al.

(10) Patent No.: US 12,650,405 B2
(45) Date of Patent: Jun. 9, 2026

(54) ELECTROCHEMICAL SENSOR FOR DETECTING IMIDACLOPRID

(71) Applicant: NAJRAN UNIVERSITY, Najran (SA)

(72) Inventors: Farid A. Harraz, Najran (SA); Md. A. Rashed, Najran (SA); M. Faisal, Najran (SA); S.A. Alsareii, Najran (SA); Mabkhoot Alsaiari, Najran (SA); Mohammed Jalalah, Najran (SA)

(73) Assignee: NAJRAN UNIVERSITY, Najran (SA)

(*) Notice: Subject to any disclaimer, the term of this patent is extended or adjusted under 35 U.S.C. 154(b) by 727 days.

(21) Appl. No.: 18/149,708

(22) Filed: Jan. 4, 2023

(65) Prior Publication Data

US 2024/0230584 A1 Jul. 11, 2024

(51) Int. Cl.

*G01N 27/414* (2006.01)
*B82Y 15/00* (2011.01)

(52) U.S. Cl.

CPC .......... *G01N 27/4146* (2013.01); *B82Y 15/00* (2013.01)

(58) Field of Classification Search

None
See application file for complete search history.

(56) References Cited

FOREIGN PATENT DOCUMENTS

| | | |
|---|---|---|
| CN | 109738508 A | 5/2019 |
| CN | 111085181 A | 5/2020 |
| CN | 110568037 B | 12/2021 |
| CN | 113970585 A | 1/2022 |

OTHER PUBLICATIONS

G. Pan, et al., "Electrochemical Determination of Imidacloprid in Soil Sample Based on Photosynthesized Silver Nanoparticles from Hypnea musciformis", International Journal of Electrochemical Science, 11(7): p. 5952-5961, Jul. 2016.*

J.C. Ndamanisha, et al., "Ordered mesoporous carbon for electrochemical sensing: A review", Analytica Chimica Acta, 727: p. 19-28, Oct (Year: 2012).*

X. Cao, et al., "A novel non-enzymatic glucose sensor modified with Fe2O3 nanowire arrays", Analyst, 136(20): p. 4241-4246 (Year: 2011).*

Ding Jiang, et al., "Silver nanoparticles anchored on nitrogen-doped graphene as a novel electrochemical biosensing platform with enhanced sensitivity for aptamer-based pesticide assay", Analyst, vol. 140, Issue 18, Jul. 27, 2015, pp. 6404-6411 (Abstract only).

Xiaojie Shi, et al., "Novel electrochemical aptasensor with dual signal amplification strategy for detection of acetamiprid", Science of the Total Environment, vol. 705, Article No. 135905, Feb. 25, 2020, 2 pages (Abstract only).

* cited by examiner

*Primary Examiner* — J. Christopher Ball
(74) *Attorney, Agent, or Firm* — Oblon, McClelland, Maier & Neustadt, L.L.P.

(57) ABSTRACT

A method of detecting an imidacloprid compound including: contacting an electrochemical sensor with a solution; applying a potential across the electrochemical sensor in the solution. The method further includes measuring the current output of the electrochemical sensor; and determining if the imidacloprid compound is present in the solution based on the current output. The electrochemical sensor includes at least one layer of a nanocomposite at least partially coating a substrate surface. The nanocomposite includes silver nanoparticles, mesoporous carbon, and hematite ore.

16 Claims, 22 Drawing Sheets

| Element | Weight% | Atomic% |
|---|---|---|
| C K | 22.59 | 42.57 |
| O K | 23.10 | 32.69 |
| Al K | 2.90 | 2.43 |
| Si K | 4.15 | 3.34 |
| Fe K | 46.33 | 18.78 |
| Ag L | 0.94 | 0.20 |
| Totals | 100.00 | |

ELECTROCHEMICAL SENSOR FOR DETECTING IMIDACLOPRID

STATEMENT OF PRIOR DISCLOSURE BY INVENTOR

Aspects of the present disclosure are described in Md. A. Rashed, M. Faisal, S. A. Alsareii, Mabkhoot Alsaiari, Mohammed Jalalah, and Farid A. Harraz "Highly sensitive and selective electrochemical sensor for detecting imidacloprid pesticide using novel silver nanoparticles/mesoporous carbon/hematite ore ternary nanocomposite"; Journal of Environmental Chemical Engineering, 10, 5, Jul. 30, 2022, 108364, incorporated herein by reference in its entirety.

STATEMENT OF ACKNOWLEDGEMENT

The support of the Deputyship for Research and Innovation-Ministry of Education, Kingdom of Saudi Arabia for this research through a grant (NU/IFC/ENT/01/002) under the Institutional Funding Committee at Najran University, Kingdom of Saudi Arabia is gratefully acknowledged.

BACKGROUND

Technical Field

The present disclosure is directed to an electrochemical sensor and particularly relates to a method of detecting imidacloprid compounds with an electrochemical sensor.

Description of Related Art

The "background" description provided herein is to generally present the context of the disclosure. Work of the presently named inventors, to the extent it is described in this background section, as well as aspects of the description that may not otherwise qualify as prior art at the time of filing, are neither expressly nor impliedly admitted as prior art against the present invention.

Contamination of surface and groundwater with hazardous organic and inorganic substances is one of the major concerns for the environment. Among the pollutants are pesticides, which are widely used in crops, fruit gardens, and forests to prevent insects, fungi, and other pests, in order to increase food production. Every year, millions of tons of pesticides are used in agriculture, and the residues of used pesticides easily flow into water systems through runoff and drainage of agricultural areas. As a result, pesticides can contaminate drinking water, thereby impacting human health. Therefore, great attention has been towards efficiently detecting pesticide concentration in environmental water samples. However, due to the expensive and time-consuming analytical procedures for pesticide detection in environmental samples, continuous monitoring is not feasible in most cases.

Imidacloprid (IMC; [1-(6-chloro-3-pyridymethyl)-N-nitroimidazolidin-2-ylideneamine]) is an insecticide for crop protection and is considered the first member of the neonicotinoids family, which occupies 10-15% of the total pesticides market. Because of its long aerobic half-life, low cost, availability, as well as high solubility in water, IMC is widely used in agriculture. Thus, monitoring of the concentration of IMC in water systems is critical in reducing adverse effects on the environment, and human health.

Conventionally, a range of analytical techniques have been applied for the detection of the IMC, including high-performance liquid chromatography (HPLC), gas chromatography-mass spectroscopy (GC-MS), spectrophotometry, capillary electrophoresis, colorimetry, surface-enhanced Raman scattering, and enzyme-linked immunosorbent assay (ELISA). Though these techniques are sensitive, the complex analytical procedures, durability, expensive instrumentation, sophisticated sample preparation, and a considerable amount of organic solvents restrict their application towards the detection and quantification of IMC.

On the other hand, electrochemical techniques proved to be convenient, simple, rapid, highly selective, sensitive, as well as environmentally friendly tool as they require minimal use of organic solvents to detect IMC in water. Moreover, based on its' molecular structure, it is apparent that IMC is electrochemically active due to having a nitro group, which can be electrochemically reduced on an active electrode surface.

Hematite ore is a naturally occurring iron oxide compound with the formula, $Fe_2O_3$ and is widely found in rocks and soils. Hematite is n-type semiconductor with a band gap of about 2.2 eV, and in certain applications it has high catalytic activity, adsorption affinity, and biocompatibility, as well as it is non-toxic, abundant, and easy to fabricate and store. However, due to poor dispensability and high aggregation, pristine $Fe_2O_3$ is not suitable for sensor applications. Therefore, it may be added to a conductive support matrix to overcome these drawbacks. Further, noble metal nanoparticles (such as Pt, Pd, Au, and Ag) have been used in electrochemical sensor applications due to their sensing and electrocatalytic activities. However, the propensity of aggregation of Ag nanoparticles is a drawback, which can also potentially be solved by the dispersion of Ag nanoparticles into suitable host matrices.

Carbon nanomaterials such as 3D carbon foam, carbon nanotubes (CNTs), and reduced graphene oxide (rGO) are applied to fabricate nanocomposites. They have been used in electro-analytical applications because of the low residual current, wide potential window, and exceptional chemical stability in various electrolytic media. Among various types of carbon nanomaterials, mesoporous carbon (Meso-C) is favorable due to its high specific surface area, porosity, high conductivity, and thermal and chemical stability.

However, there still exists a challenge in fabricating an electrochemical sensor with a simple fabrication technique, and with excellent electrocatalytic and sensing properties for IMC detection. Accordingly, an object of the present disclosure is to provide an electrochemical sensor that overcomes some or all the limitations of the art.

SUMMARY

In an exemplary embodiment, a method of detecting an imidacloprid (IMC) compound is described. The method includes contacting an electrochemical sensor with a solution; applying a potential across the electrochemical sensor in the solution; measuring the current output of the electrochemical sensor; and determining if the imidacloprid compound is present in the solution based on the current output, wherein the electrochemical sensor comprises at least one layer of a nanocomposite at least partially coating a surface of a substrate, wherein the nanocomposite comprises: silver nanoparticles; mesoporous carbon; and hematite ore; wherein the mesoporous carbon is distributed over the hematite ore to form a composite, and the silver nanoparticles are uniformly distributed over a surface of the composite to form the nanocomposite.

In some embodiments, the particles of the hematite ore have a nanorod shape with an average length of 10 nanometers (nm) to 10 micrometers (µm) and an average width of 10-500 nm.

In some embodiments, the hematite ore has $Fe_2O_3$ and $Fe_3O_4$ phases.

In some embodiments, the silver nanoparticles are substantially spherical and have an average diameter of 1-20 nm.

In some embodiments, the mesoporous carbon has an average pore diameter of 10-200 Angstrom (Å).

In some embodiments, the mesoporous carbon has a nano-sheet morphology.

In some embodiments, the mesoporous carbon has a surface area of 100-300 square meter pr gram ($m^2/g$).

In some embodiments, the nanocomposite comprises 0.1-5 wt. % silver nanoparticles, 1-5 wt. % mesoporous carbon, and 90-98 weight percent (wt. %) hematite ore, based on the total weight of the nanocomposite.

In some embodiments, the nanocomposite 30-50 atomic percent (at. %) carbon, 20-40 at. % oxygen, 1-5 at. % aluminum, 1-5 at. % silicon, 15-25 at. % iron, and 0.01-2 at. % silver based on a total at. % of the nanocomposite.

In some embodiments, the silver nanoparticles are uniformly distributed over the surface of the composite via charge transfer interactions.

In some embodiments, the silver nanoparticles are not in the pores of the mesoporous carbon.

In some embodiments, the silver nanoparticles are not aggregated.

In some embodiments, the particles of the hematite ore are not aggregated.

In some embodiments, the substrate is made from a material selected from the group consisting of glassy carbon, gold, silver, platinum, and boron-doped diamond.

In some embodiments, the electrochemical sensor has a reduction potential less than −1.0 volt (V) vs Ag/AgCl.

In some embodiments, the electrochemical sensor has a detection limit of the imidacloprid compound of 0.1 to 2 µM.

In some embodiments, the electrochemical sensor selectively detects the imidacloprid compound in the solution.

The foregoing general description of the illustrative present disclosure and the following detailed description thereof are merely exemplary aspects of the teachings of this disclosure and are not restrictive.

BRIEF DESCRIPTION OF DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
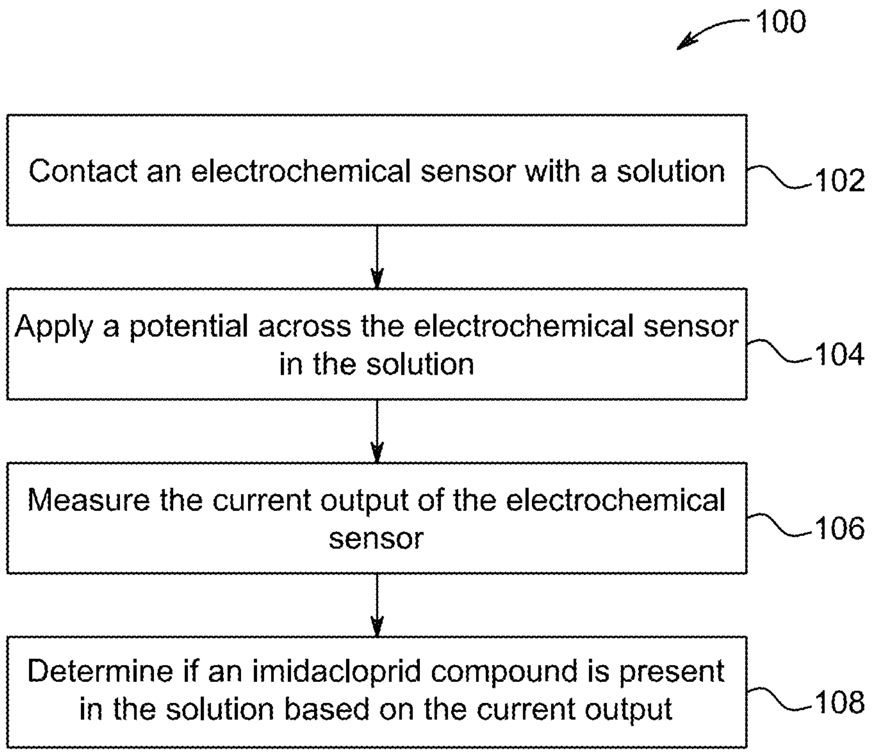
FIG. 1 is a flowchart of a method of detecting an imidacloprid (IMC) compound, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values there between.

All ranges disclosed herein are inclusive of the endpoints, and the endpoints are independently combinable with each other, and inclusive of all intermediate values of the ranges. Thus, ranges articulated within this disclosure, e.g. numerics/values, shall include disclosure for possession purposes and claim purposes of the individual points within the range, sub-ranges, and combinations thereof.

Aspects of the present disclosure are directed to an electrochemical sensor for sensitive and selective determination of imidacloprid (IMC) pesticide, with a nanocomposite including Ag nanoparticles deposited on mesoporous carbon (meso-C) and naturally extracted hematite ore (Ag@meso-C/hematite ore) (also referred to as the nanocomposite or ternary nanocomposite). The nanocomposite based sensor of the present disclosure demonstrates selectivity, reproducibility, repeatability, and storage stability.

IMC, having the chemical Formula I below, is a pesticide belonging to a class of chemicals called the neonicotinoids. Neonicotinoids work by interfering with the transmission of stimuli in the insect nervous system. Although this disclosure is directed towards detection of IMC, one skilled in the art would recognize that this could also be used to detect other neonicotinoids such as clothianidin, dinotefuran, thiamethoxam, and/or nitenpyram.

Formula I

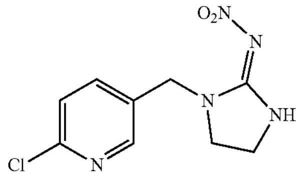

The electrochemical sensor also referred to as the "sensor" includes at least one layer of nanocomposite at least partially coated on a substrate. In other words, the substrate may be wholly/partially coated with one or more layers of the nanocomposite, preferably at least 50% of the substrate is covered, more preferably 60%, 70%, 80%, 90%, or 100%. The substrate can have 1 to 1,000 layers of the nanocomposite, preferably 1 to 500, 1 to 100 or 1 to 10 layers. The layers have a thickness of 10 to 1,000 nm, preferably 50 to 500 nm, or 100-200 nm. The substrate is made from a material selected from the group consisting of glassy carbon, gold, silver, platinum, and boron doped diamond. In a preferred embodiment, the substrate is glassy carbon electrode (GCE). The GCE is modified with a layer of the nanocomposite to form the sensor, also referred to as a working electrode.

The nanocomposite includes silver (Ag) nanoparticles, mesoporous carbon, and hematite ore. The silver nanoparticles are distributed on mesoporous carbon and hematite ore to form the (Ag@meso-C/hematite ore) nanocomposite (also referred to as the nanocomposite). In some embodiments, the nanocomposite includes 0.1-5 wt. % silver nanoparticles, preferably 0.5-4 wt. %, 1-3 wt. %, or approximately 2 wt. %, 1-5 wt. % mesoporous carbon, preferably 1-4 wt. %, or 2-3 wt. %, and 90-98 wt. % hematite ore, preferably 92-96 wt. % or approximately 94 wt. % based on the total weight of the nanocomposite. In some embodiments, the elemental composition of the nanocomposite includes 30-50 atomic percent (at. %) carbon, preferably 35-45 at. % or approximately 40 at. %, 20-40 at. % oxygen, preferably 25-35 at. % or approximately 30 at. %, 1-5 at. % aluminum, preferably 2-4 at. % or approximately 3 at. %, 1-5 at. % silicon, preferably 2-4 at. % or approximately 3 at. %, 15-25 at. % iron, preferably 17-22 at. %, or approximately 20 at. %, and 0.01-2 at. % silver, preferably 0.1 to 1.0 at. % silver or approximately 0.5 at. %, a based on a total at. % of the nanocomposite. In some embodiments, each element is distributed homogeneously in the nanocomposite. In some embodiments, Si and Al are not present in the nanocomposite.

In some embodiments, the hematite is man-made. In some embodiments, the hematite is naturally extracted. In some embodiments, the hematite ore has both $Fe_2O_3$ and $Fe_3O_4$ phases with a ratio of 0.5 to 2:1 ($Fe_2O_3$: $Fe_3O_4$), preferably 0.5:1, 0.7:1, 1:1, 1.2:1, or 1.5:1, or 1.8:1. In some embodiments, the hematite ore has only a $Fe_2O_3$ phase. In some embodiments, the hematite ore has only a $Fe_3O_4$ phase. Particles of the hematite ore have a shape selected from the group consisting of spherical, rod, cubic, needle, octahedral, or platelet. In some embodiments, the particles of the hematite ore have a nanorod shape. The nanorods have an average length of 10 nm to 10 μm, preferably 100 to 5,000 nm, 500 to 3,000 nm, or 1,000 to 2,000 nm and an average width of 10-500 nm, preferably 50-400 nm, 100-300 nm, or approximately 200 nm. In some embodiments, the particles of the hematite ore are not aggregated in the nanocomposite.

In some embodiments, the mesoporous carbon has a nano-sheet morphology. The nano-sheets have an average thickness of 10 to 100 nm, preferably 20 to 90 nm, 30 to 80 nm, 40 to 70 nm, or 50 to 60 nm. In some embodiments, the mesoporous carbon has an average pore diameter of 10-200 Å, preferably 50-150 Å, approximately 100 Å. In some embodiments, the mesoporous carbon has a surface area of 100-300 $m^2/g$, preferably 150-250 $m^2/g$, or approximately 200 $m^2/g$.

In some embodiments, the silver nanoparticles have a shape selected from the group consisting of spherical, rod, cubic, needle, octahedral, or platelet. In some embodiments, the silver nanoparticles are substantially spherical. In some embodiments, the silver nanoparticles have an average diameter of 1-20 nm, particularly in a range of 1-10 nm, and more specifically about 6-7 nm. In some embodiments, the silver nanoparticles are not aggregated in the nanocomposite.

In some embodiments, the mesoporous carbon and hematite form a composite where the mesoporous carbon is distributed over the hematite particles. In some embodiments, the mesoporous carbon is distributed over at least 20%, preferably 30%, 40%, 50%, 60%, 70%, 80%, 90%, or 100% of the hematite particles. Although not willing to be bound to one particular theory, it is thought that the mesoporous carbon prevents the hematite from aggregating by forming a barrier between particles of the hematite.

In some embodiments, the Ag nanoparticles are distributed on a surface of the mesoporous carbon and hematite composite. In some embodiments, the silver nanoparticles are not in the pores of the mesoporous carbon. In some embodiments, the Ag nanoparticles are uniformly or randomly distributed on a surface of the mesoporous carbon and hematite composite. In some embodiments, the Ag nanoparticles interact with the mesoporous carbon and hematite composite via van der Waals forces and/or electrostatic forces. In some embodiments, the Ag nanoparticles interact with the mesoporous carbon and hematite composite via charge-transfer interactions. Although not willing to be bound to one particular theory, it is thought that the charge-transfer interactions of the Ag nanoparticles with the mesoporous carbon and hematite composite prevent the formation of Ag nanoparticle aggregates in the nanocomposite.

Referring to FIG. 1, a flow chart of a method 100 of detecting imidacloprid is illustrated. Although the description, and the examples herein provided refer to the use of the nanocomposite for the detection of imidacloprid, it may be understood by a person skilled in the art that the nanocomposite may also be used for detection of other target analytes as well, albeit with a few variations, as may be obvious to a person skilled in the art. The order in which the method 100 is described is not intended to be construed as a limitation, and any number of the described method steps can be combined in any order to implement the method 100. Additionally, individual steps may be removed or skipped from the method 100 without departing from the spirit and scope of the present disclosure.

At step 102, the method 100 includes contacting an electrochemical sensor with a solution. In order to detect the presence of imidacloprid, the electrochemical sensor (containing the nanocomposite) is brought in contact with a solution. In some embodiments, the sensor is at least partially submerged in the solution preferably 20%, 30%, 40%, 50%, 60%, 70%, 80%, 90%, or 100% is submerged. The solution may or may not contain imidacloprid. In some embodiments, the solution may contain imidacloprid in addition to other ions/compounds. Other ions/compounds may include but are not limited to KCl, $Na_2SO_4$, $NaNO_3$, $K_2CO_3$, $MgSO_4$, $CaCl_2$), glucose, citric acid (CA), ascorbic acid (AA), hydroquinone (HQ), dopamine (DA), and/or acetamiprid (ACETA). In a preferred embodiment, the solution is an aqueous solution. The aqueous solution may be but is not limited to salt water, waste water, tap water, or runoff water from an agricultural field.

At step 104, the method 100 includes applying a potential across the electrochemical sensor in the solution. During this process, a potential is applied across the electrodes, namely, the working electrode, reference electrode, and the counter electrode. The working electrode is the electrochemical sensor. Examples of the reference electrode are Ag/AgCl (KCl sat.), calomel, or hydrogen electrodes. In a preferred embodiment, the reference electrode is Ag/AgCl (KCl sat.). Examples of the counter electrode may include platinum, platinum black, platinum oxide, coated platinum, silver, and gold. Moreover, titanium, stainless steel, nickel, and aluminum whose surfaces are passivated can also be used as the material of the counter electrode. Furthermore, carbon structures such as graphite and carbon nanotube, amorphous carbon, and glassy carbon can also be used. Among these materials, platinum, platinum black, platinum oxide, platinum spiral, and coated platinum are preferable. In a preferred embodiment, the counter electrode is a platinum spiral. In an embodiment, the potential is 0 to 1.0 V vs Ag/AgCl. In an embodiment, the scan rate is from 5 to 300 mV/s.

At step 106, the method 100 includes measuring the current output of the electrochemical sensor. The current output is measured with any technique known in the art. In an embodiment, the current output is measured with cyclic voltammetry.

At step 108, the method 100 includes determining if the imidacloprid compound is present in the solution based on the current output. When the sensor is contacted with the solution, if there is IMC present it can adsorb onto the sensor. In an embodiment, IMC is adsorbed onto the hematite, mesoporous carbon and/or silver nanoparticles in the nanocomposite of the sensor. In a preferred embodiment, IMC is adsorbed onto the hematite. In some embodiments, the hematite has —OH and/or Fe—O bonds on its surface that facilitate the adsorption of the IMC.

A change in the signal of the current output compared to the sensor on its own, is indicative of the presence of IMC in the solution. In an embodiment, the change in current occurs due to the reduction of the nitro (—$NO_2$) group on the IMC that is adsorbed onto a surface of the sensor. In an embodiment, the reduction of the IMC is irreversible.

In an embodiment, the change in electrical current varies based on the concentration of the IMC in the solution. In some embodiments, the degree of change in the current output correlates to the concentration of the IMC. In some embodiments, the degree of change in the current output linearly correlates to the concentration of the IMC. In an embodiment, with higher concentrations of IMC the current becomes more negative. In some embodiments, the electrochemical sensor has a detection limit of the imidacloprid compound of 0.1 to 2 μM, preferably 0.2 to 1.5 μM, or 0.5 to 1 μM. In other words, the sensor can detect even small amounts of IMC in the solution. In some embodiments, the electrochemical sensor selectively detects the imidacloprid compound in the solution. As previously described, the solution may have other ions/compounds however the sensor will selectively detect IMC over these ions/compounds.

In some embodiments, the electrochemical sensor has a reduction potential less than −1.0 volt (V) vs Ag/AgCl, preferably −0.9 to −0.5, −0.8 to −0.6 or approximately −0.7. In other words the sensor requires less than −1V applied to donate an electron. The donated electron participates in the reduction of IMC. The lower (less negative) reduction potential i.e. less than −1 V thereby requires less energy input and improves efficiency of detecting the IMC. This property is a result of the combination of merits of the three different components of the nanocomposite.

EXAMPLES

The disclosure will now be illustrated with working examples, which are intended to illustrate the working of disclosure and not intended to restrictively imply any limitations on the scope of the present disclosure. The working examples depict a method of detecting the imidacloprid compound with the electrochemical sensor of the present disclosure.

Example 1: Materials and Methods

Hematite ore was collected from the rocks of Yadmah (Northern part of Najran province), Saudi Arabia, and ground using a mechanical grinder. The naturally extracted ore was used for catalyst fabrication without any further chemical or heat treatment except washing and cleaning with water and ethanol mixture to remove the dust. Mesoporous carbon, $AgNO_3$, 5 wt. % Nafion, ethanol, methanol, and isopropyl alcohol were purchased from Sigma-Aldrich and used as received. The phosphate buffer solution was prepared using $NaH_2PO_4$ and $Na_2HPO_4$. $2H_2O$, purchased from Sigma-Aldrich. The solution pH was adjusted using 0.1 M HCl/0.1 M NaOH.

Example 2: Fabrication of Meso-C/Hematite Ore and Ag@Meso-C/Hematite Ore Nanocomposites An ultrasonication technique was applied for the preparation of 5 wt % meso-C/hematite ore composite. Typically, 0.47 g of hematite ore and 0.025 g mesoporous carbon were taken in 90 ml DI water to obtain a suspension. The suspension was then sonicated for 1 h at ambient temperature to obtain a blend. The blend was washed and cleaned with DI water-methanol mixture several times and dried in an oven at 60° C. overnight to get a 5 wt % meso-C/hematite ore hybrid structure. 1 wt % Ag@ 5 wt % meso-C/hematite ore nanocomposite was synthesized by the photo-reduction method [M. Faisal, M. A. Rashed, J. Ahmed, M. Alsaiari, A. S. Alkorbi, M. Jalalah, S. A. Alsareii, F. A. Harraz, Rapid photodegradation of linezolid antibiotic and methylene blue dye over Pt nanoparticles/polypyrrole-carbon black/ZnO novel visible light photocatalyst, J. Environ. Chem. Eng. (2021), 106773, herein incorporated by reference]. The required amount of $AgNO_3$ salt to achieve 1 wt % Ag concentration in the composite was added to the solution of 0.1 g of 5 wt % meso-C/hematite ore in 20 ml water. 1.0 ml of methanol was subsequently injected into the suspension. The suspending mixture was then treated under Osram™ Hg lamp (illumination intensity at 350 nm: 2.0 mW $cm^{-2}$) for 20 h. Further, centrifugation was employed followed by washing several times with DI water-methanol mixture. The mixture was then filtered leaving behind a solid residue. Finally, the solid residue was dried at 65° C. overnight to obtain 1 wt % Ag@ 5 wt % meso-C/hematite ore ternary structure (herein referred to as Ag@meso-C/hematite ore nanocomposite).

Example 3: Characterization of Fabricated Nanocomposites

Several advanced spectroscopic and microscopic analytical techniques were employed for a systematic characterization of surface and structural properties of the as-fabricated nanocomposite electrocatalysts. To evaluate the structural property of samples, an X-ray diffractometer (PANalytical 'X'pertpro) with a radiation source Cu $K\alpha_{1/2}$, $\lambda\alpha_1$=154.06 pm, $\lambda\alpha_2$=154.44 pm was used. The as-fabricated nanocomposite was studied using the X-ray photoelectron spectroscopy (XPS) technique. XPS spectral lines were recorded using a K-alpha spectrometer (Thermo Fisher Scientific, USA) with a radiation source AlKα for −10-1350 eV. The deconvolution in narrow scan spectra was done using XPS PEAKFIT bundle software with a linear background. The morphologies of the nanocomposite and base materials were studied with a transmission electron microscope (TEM) and field emission scanning electron microscope (FE-SEM). TEM and high-resolution TEM (HR-TEM) images were recorded with a JEOL JEM-2100 F-UHR field-emission instrument fitted with a Gatan GIF 2001 energy filter in an acceleration voltage of 200 kV and a 1 k-CCD camera. Energy dispersive spectroscopy (EDS) coupled FE scanning electron microanalyzer (JEOL-6300 F, 5 KV) was used for recording SEM images. Fourier transform infrared (FTIR) spectra and Raman spectra were recorded with Perkin Elmer spectrum 100 and Perkin Elmer Raman Station 400, respectively, in order to define the chemical bonds in the nanocomposite. FTIR spectra were recorded in a sample dispersed using KBr plate form.

Example 4: Sensor Electrode Preparation and Electrochemical Investigations

Figure 2:
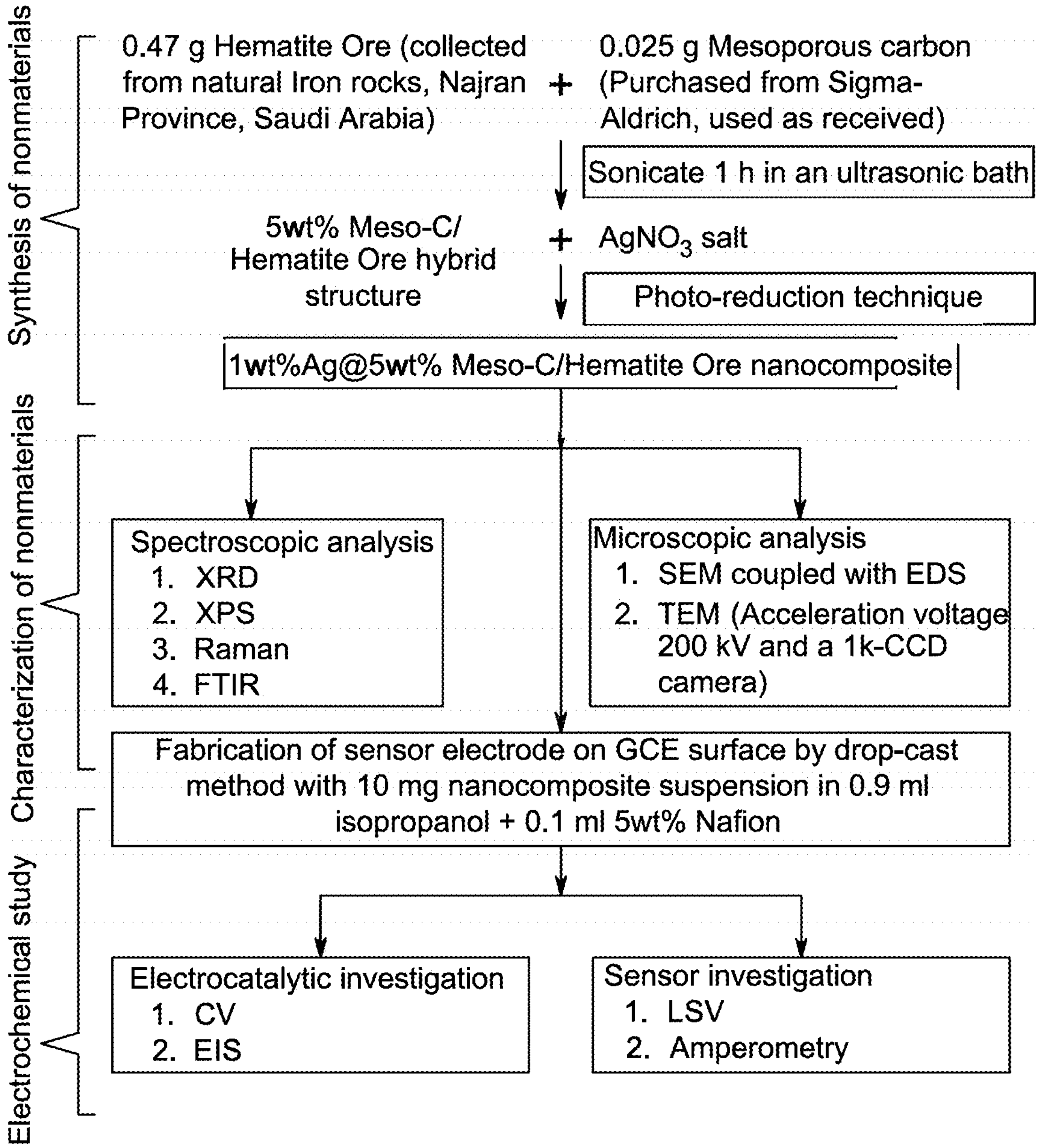
FIG. 2 is a flowchart of an experimental procedure applied in detecting the imidacloprid compound, according to certain embodiments.

A GCE (by BAS Inc. Japan) with exposed surface diameter d=3.0 mm acted as a working electrode, which was polished with diamond paste (1.0 μm) and alumina slurry (0.05 μm) before use. Then, the polished electrode surface was sonicated and rinsed with ethanol and water. The mirror-like cleaned surface was modified with the active nanocomposite using a simple drop-cast method. For this purpose, 10 mg of Ag@meso-C/hematite ore was dispersed in a solution containing 0.9 ml isopropanol and 0.1 ml 5 wt. % nafion. This was followed by 30 minutes of sonication, and a vortex was carried out to confirm the formation of a homogenous suspension. 10 μl of the formed suspension was carefully dropped (2.0 μl each drop and dried after each drop in an open-air) onto the cleaned GCE surface and dried in an oven at 60° C. for 30 min. For comparison, a similar modification procedure was applied for hematite ore/GCE, and meso-C/hematite ore/GCE sensor electrodes. Electrocatalytic and sensing studies were carried out using an electrochemical workstation using a cell with three electrodes. The nanocomposite modified GCE, Pt spiral, and Ag/AgCl (KCl sat.) acted as working, counter, and reference electrodes, respectively. All the electrochemical investigation was performed under $N_2$ saturated conditions. The experimental procedure applied in this study is summarized in the flowchart in FIG. 2

Example 5: Characterization of Materials

Figure 3:
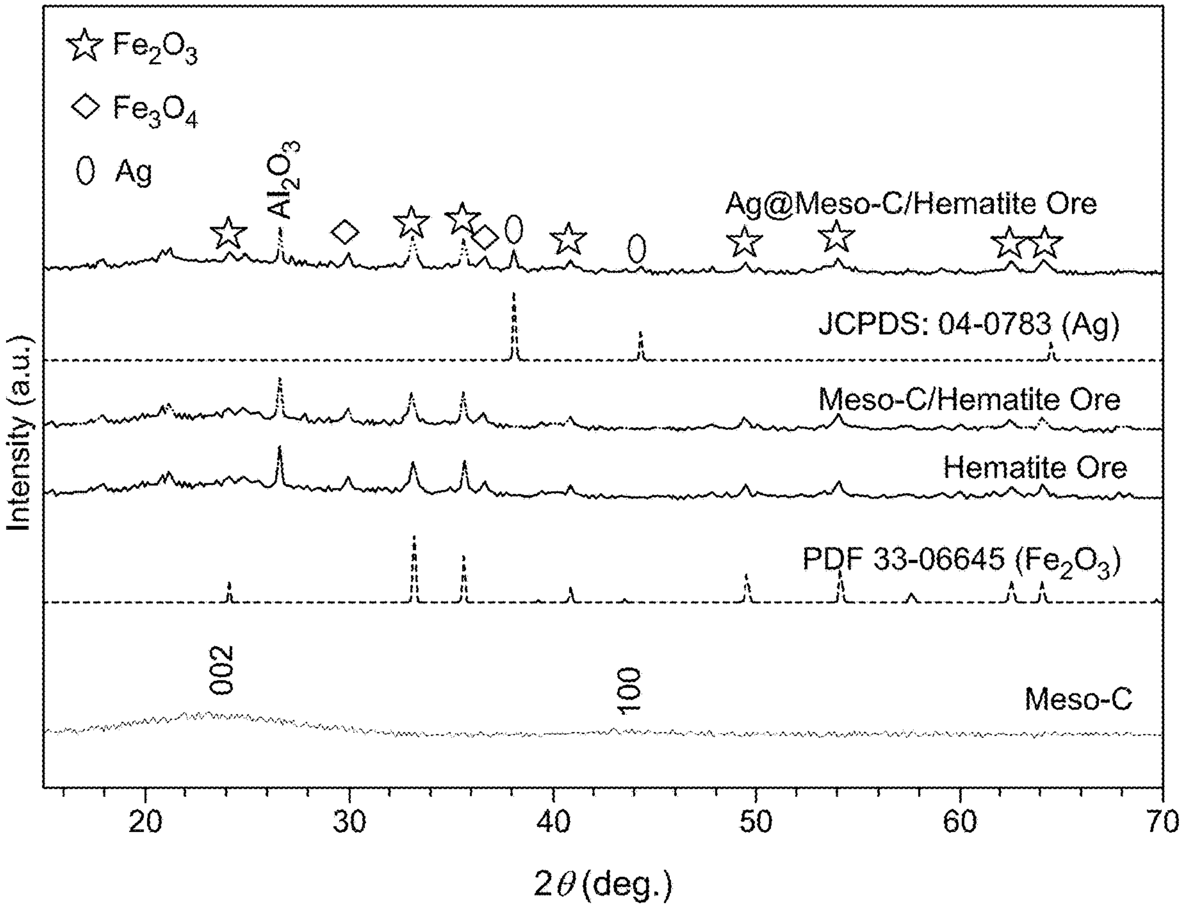
FIG. 3 is an X-ray diffraction (XRD) pattern of meso-C, undoped hematite ore, meso-C/hematite ore, Ag, and Ag@meso-C/hematite ore ternary structure, according to certain embodiments.

The structural investigation of the naturally extracted hematite ore and the fabricated ternary nanocomposite (Ag@Meso-C/hematite ore) was conducted using XRD and XPS techniques. FIG. 3 shows the typical XRD spectral pattern of mesoporous carbon, undoped hematite ore (simulated and natural), meso-C/hematite ore, Ag and Ag@meso-C/hematite ore nanocomposite materials. The XRD pattern of meso-C shows two broad peaks at 24° and 44°, corresponding respectively to (200) and (100) planes of carbon, while the XRD patterns of undoped hematite ore, meso-C/hematite ore and Ag@meso-C/hematite ore nanocomposite display well-defined peaks at 24.10°, 33.11°, 35.65°, 40.88°, 49.43°, 54.0°, 62.42°, and 63.95°, which are related to (012), (104), (110), (113), (024), (116), (214), and (300) crystalline planes of $Fe_2O_3$ (PDF No. 33-0664). The extra peaks at 30.0° and 36.7° are indexed to (220) and (311), respectively for $Fe_3O_4$ (PDF No. 99-0073). However, a peak was observed at $2\theta=26.70°$, this may be due to the presence of a trace of $Al_2O_3$ as an impurity in the naturally extracted ore. In addition to the above-mentioned peaks, the XRD pattern of the as-fabricated Ag@meso-C/hematite ore nanocomposite exhibited two additional peaks. Diffraction peaks at 38.10° and 44.32° are assigned to the crystallographic planes (111) and (200) for Ag nanoparticles (JCPDS card no. 04-0783). The XPS measurement was further performed to verify the surface composition, chemical environment, and oxidation states of the components in the fabricated ternary nanocomposite.

Figure 4:
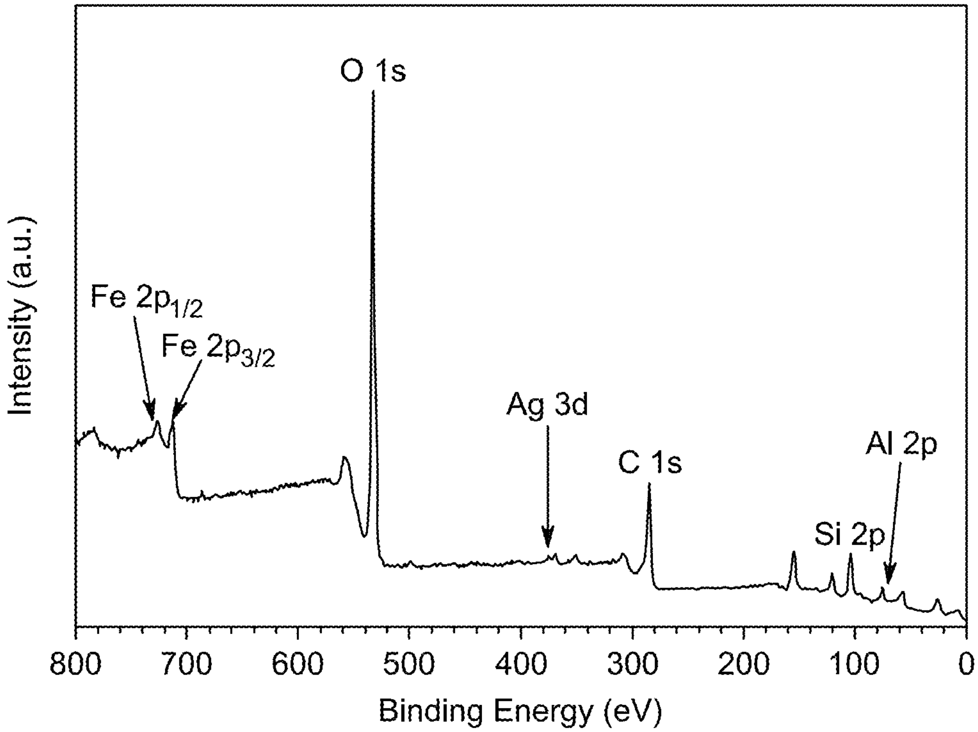
FIG. 4 illustrates a survey scan X-ray photoelectron spectroscopy (XPS) spectrum of Ag@meso-C/hematite ore ternary nanocomposite, according to certain embodiments.

The chemical states of the constituent elements were calibrated at 284.5 eV for C 1 s. The XPS survey scan spectrum of Ag@meso-C/hematite ore ternary nanocomposite shows the presence of C 1 s, Fe 2p, O 1 s, and Ag 3d in an appropriate binding energy position, confirming the successful formation of the ternary nanocomposite (FIG. 4). Spectral peaks related to Al 2p and Si 2p were also detected in the XPS survey scan spectrum, which is usually found as impurities in the naturally occurring iron ore, the ore was collected and used as received without separation, concentration, or ore beneficiation.

Figure 5A:
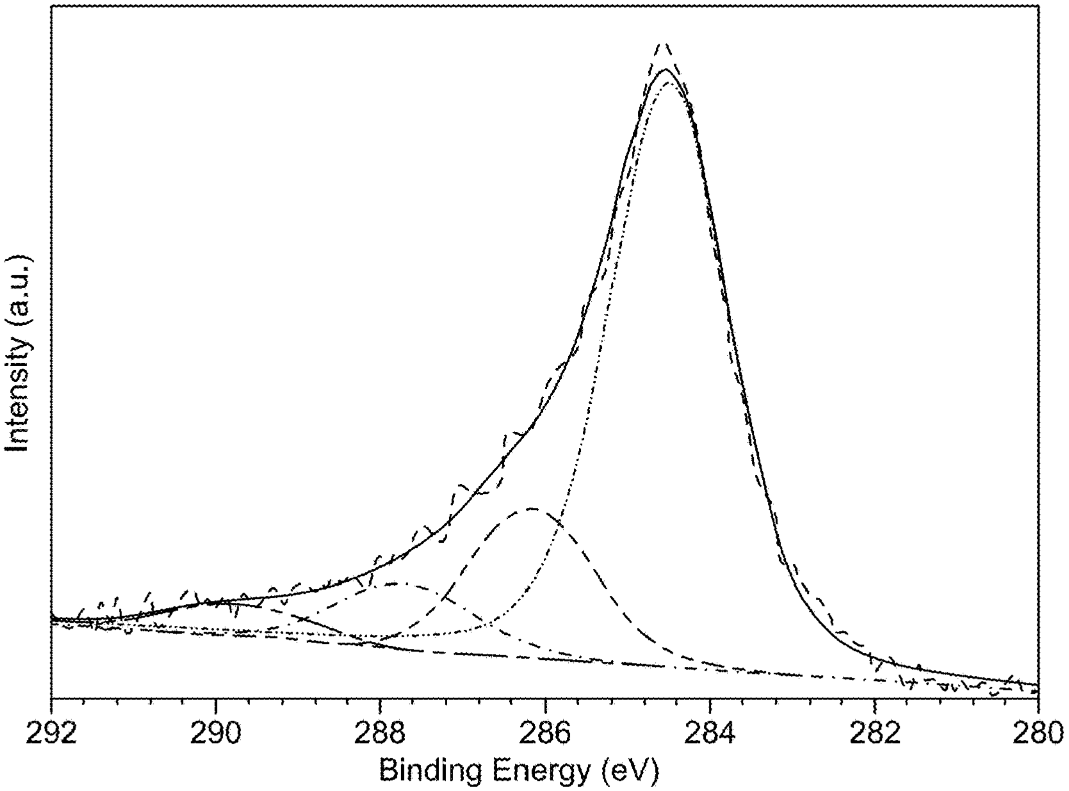
FIG. 5A illustrates an XPS core-level spectrum of the Ag@meso-C/hematite ore nanocomposite of C 1 s, according to certain embodiments.
Figure 5B:
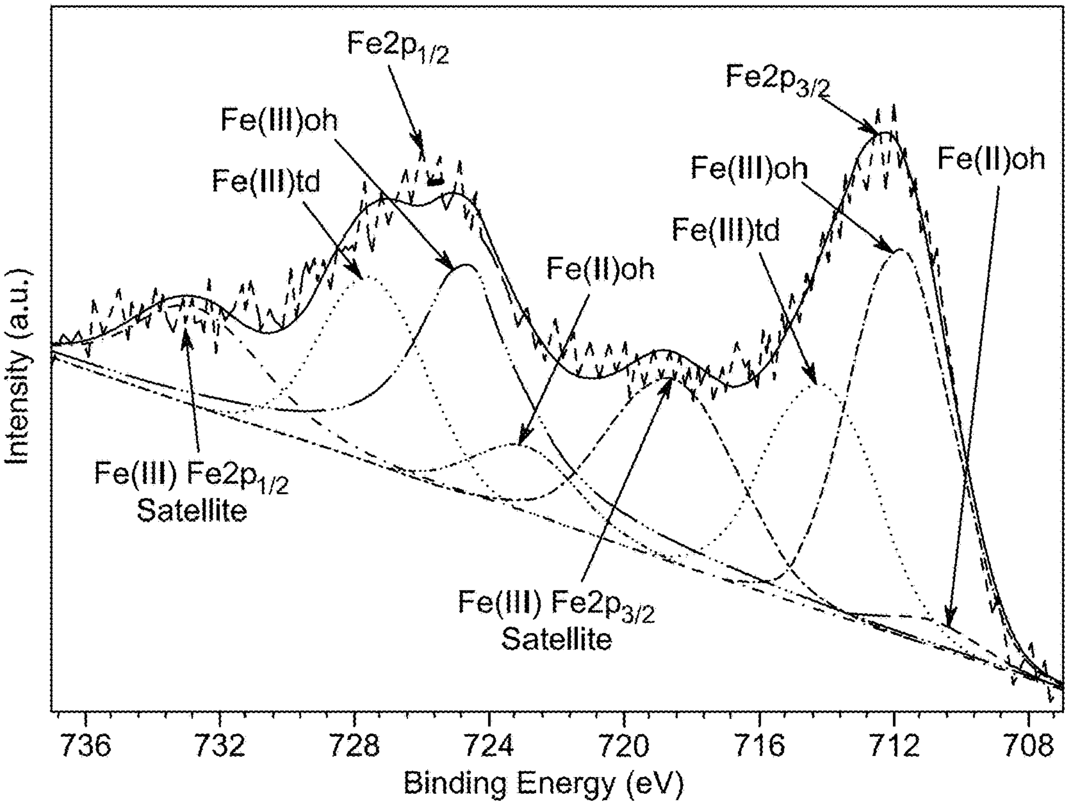
FIG. 5B illustrates an XPS core-level spectrum of the Ag@meso-C/hematite ore nanocomposite of Fe 2p, according to certain embodiments.
Figure 5C:
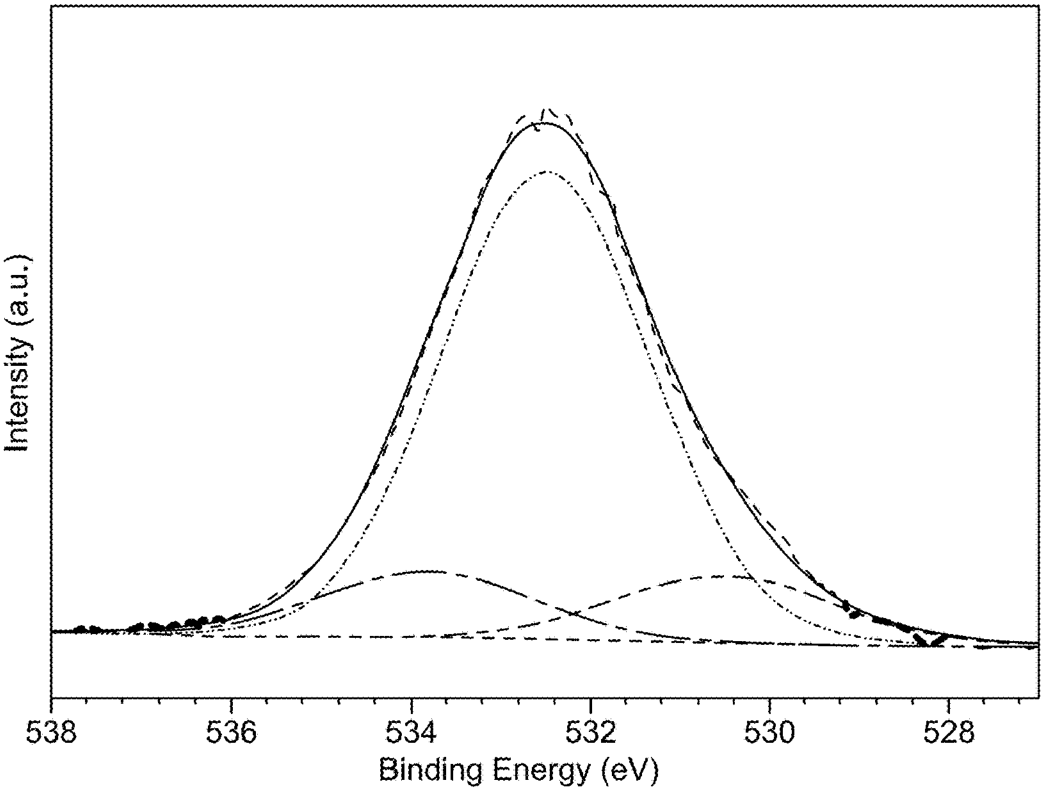
FIG. 5C illustrates an XPS core-level spectrum of the Ag@meso-C/hematite ore nanocomposite of O 1s, according to certain embodiments.

The core-level spectra of C 1 s, Fe 2p, O 1 s, and Ag 3d are shown in FIG. 5A-FIG. 5D. After deconvolution, C 1 s splits into four distinguished peaks according to the binding energies (FIG. 5A). Peaks at 284.5 eV, 286.1 eV, 287.7 eV, and 289.7 eV could be ascribed to C—C/C—H, C—OH, C═O, and O—C═O, respectively. The Fe 2p core-level spectrum consists of two main peaks at 712.0 eV and 725.1 eV, corresponding respectively to Fe $2p_{3/2}$ and Fe $2p_{1/2}$ (FIG. 5B). Due to the spin-orbit coupling, the lower binding energy peak (Fe $2p_{3/2}$) exhibits higher intensity than the peak (Fe $2p_{1/2}$) appeared at higher binding energy. After deconvolution of the major peaks, six well-defined peaks at 710.8 eV, 711.8 eV, 714.2 eV, 722.9 eV, 724.7 eV, and 727.7 eV including the satellite peaks 718.6 eV (for Fe $2p_{3/2}$) and 732.7 eV (Fe $2p_{1/2}$) were observed. The peaks at 710.8 eV and 722.9 eV correspond to $Fe^{2+}$ (oh) signal, whereas peaks appeared at 714.2 eV and 727.7 eV are ascribed to $Fe^{3+}$ (td) signal of $Fe_3O_4$ phase of Fe. In contrast, the peaks at 711.8 eV and 724.7 eV reveal the $Fe^{3+}$ (oh) signal for $Fe_2O_3$ phase of Fe. Furthermore, the satellite peaks (718.6 eV and 732.7 eV) are attributed to $Fe^{3+}$ in the $Fe_2O_3$ phase. Peak shifts may occur due to different chemical environments such as interaction among the precursors (iron oxide, carbon, and AgNPs). The ratio of $Fe_2O_3$ and $Fe_3O_4$ in the examined ore can be calculated by dividing the peak area of $Fe^{3+}$ (oh) for the $Fe_2O_3$ phase by the summation of the peak area of $Fe^{2+}$ (oh) and $Fe^{3+}$ (td) for $Fe_3O_4$ phase. The ratio was found to be 1.32:1 ($Fe_2O_3$: $Fe_3O_4$) for both main peaks (Fe $2p_{3/2}$ and Fe $2p_{1/2}$).

Figure 5D:
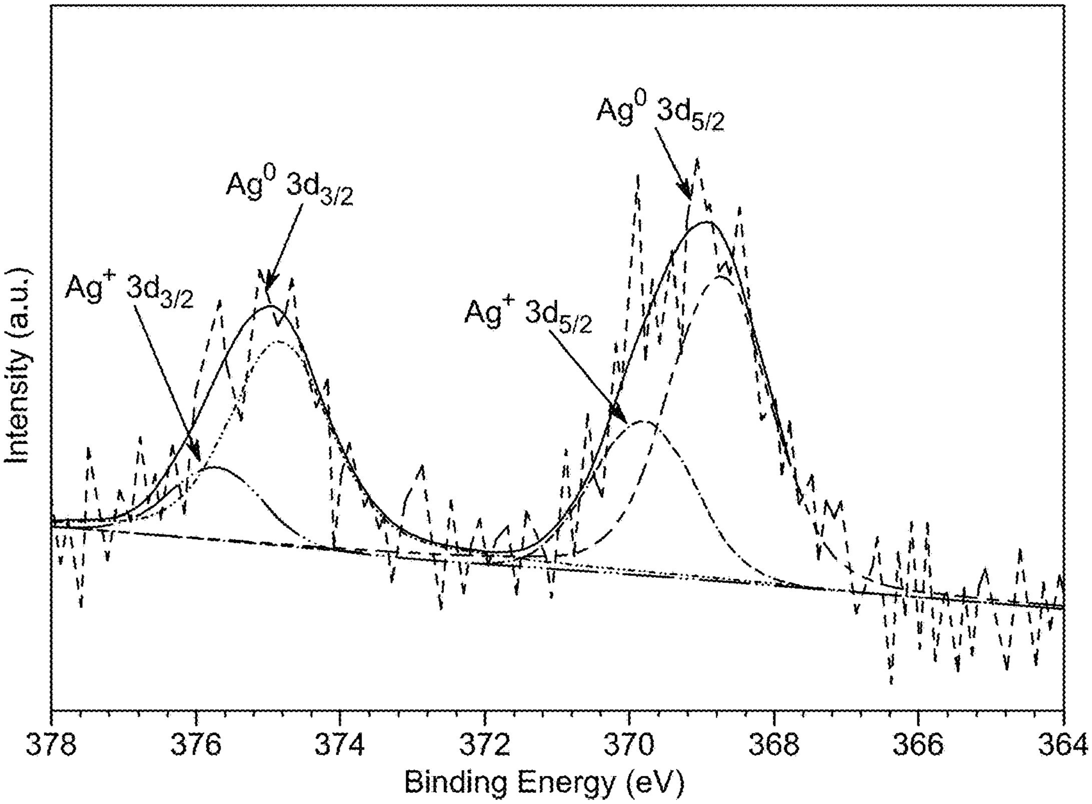
FIG. 5D illustrates an XPS core-level spectrum of the Ag@meso-C/hematite ore nanocomposite of Ag 3d, according to certain embodiments.

The core-level XPS spectra of O 1 s (FIG. 5C) display three distinguished peaks according to the binding energies. The spectral line observed at 531.1 eV is related to Fe—O—Fe/Fe—O—C. The major peak of O1s located at 532.6 eV is accredited to O—C—O. Finally, the highest binding energy peak at 533.8 eV may be due to the oxygen in adsorbed water molecules in the catalyst surface. FIG. 5D represents the core-level XPS spectra of Ag 3d. The Ag 3d contains two main peaks at 369.0 eV and 375.0 e V because of the spin-orbit coupling corresponding to Ag $3d_{5/2}$ and Ag $3d_{3/2}$. After deconvolution, the peaks are splitting at 368.7 eV/369.8 eV and 374.8 eV/375.7 eV, respectively. The peaks at 368.7 eV and 374.8 eV signify the presence of metallic silver, whereas the shoulder-like peaks at 369.8 eV and 375.7 eV, clarify the existence of ionic silver (Ag+) in the nanocomposite. In both (major and shoulder-like peaks) the peak separation is 6.0 V. However, both doublets appeared at relatively higher binding energy than the reported, because of the electron transfer from the lower work function Ag (4.3 eV) to the higher work function of $Fe_2O_3$ (5.4 eV)/$Fe_3O_4$ (5.3 eV) as well as the probable charge transfer between AgNPs and porous carbon.

Figure 6A:
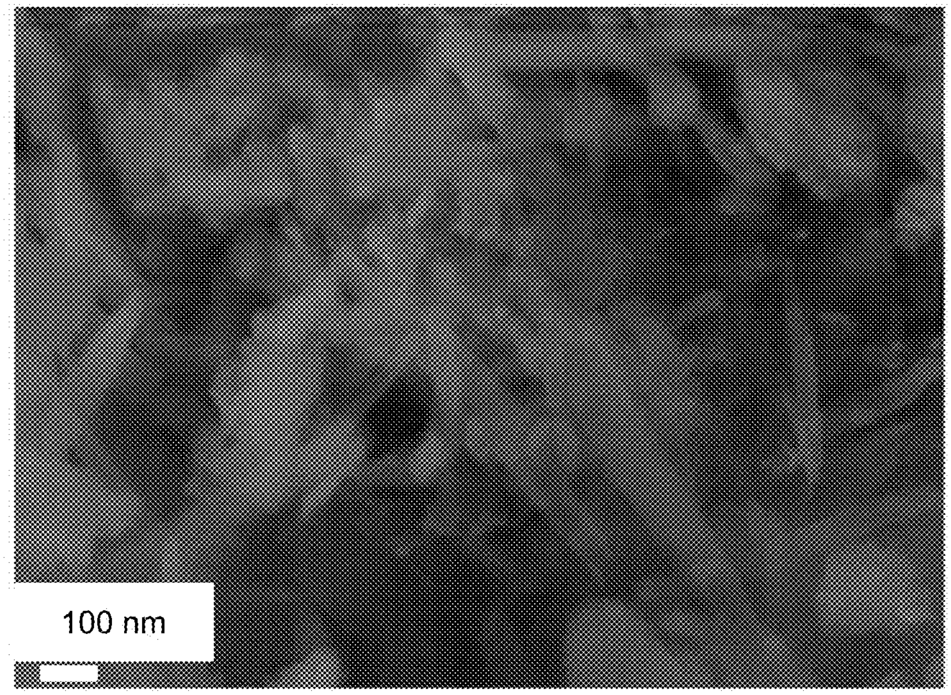
FIG. 6A illustrates a scanning electron microscope (SEM) image of undoped hematite ore, according to certain embodiments.
Figure 6B:
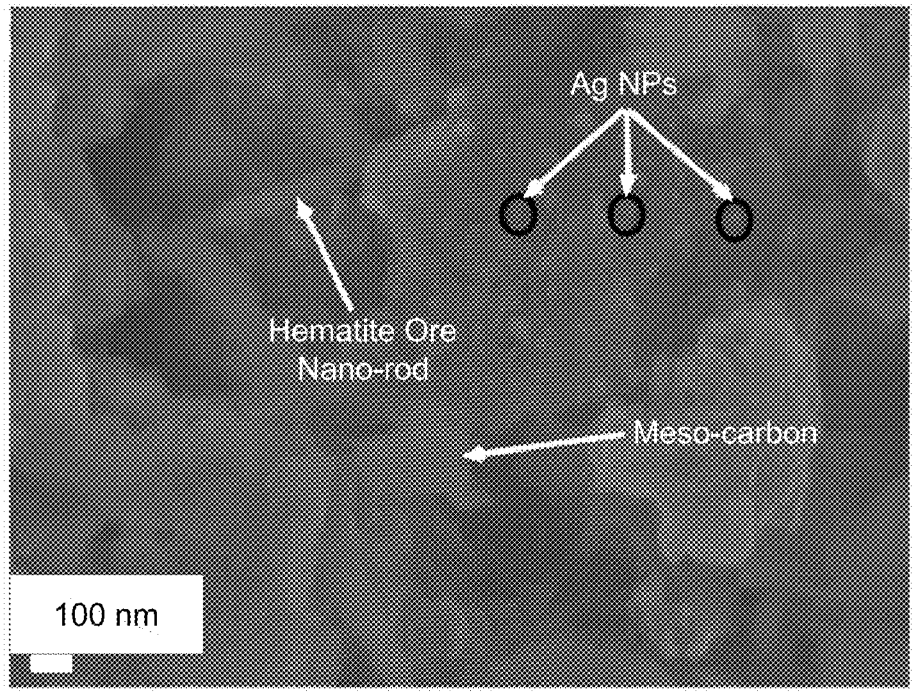
FIG. 6B illustrates an SEM image of Ag@meso-C/hematite ore nanocomposite, according to certain embodiments.

The surface morphology of the undoped hematite ore and the newly prepared nanocomposite was investigated using FESEM. FIG. 6A represents the FESEM image of the undoped hematite ore, showing the rod-like morphology, confirming the nano-rods structure of the examined hematite ore. FESEM image of Ag@meso-C/hematite ore nanocomposite, as shown in FIG. 6B, reflects meso-C nano-sheet dispersed over the hematite ore nano-rods, and AgNPs are distributed on the meso-C/hematite ore nanocomposite surface.

Figure 7A:
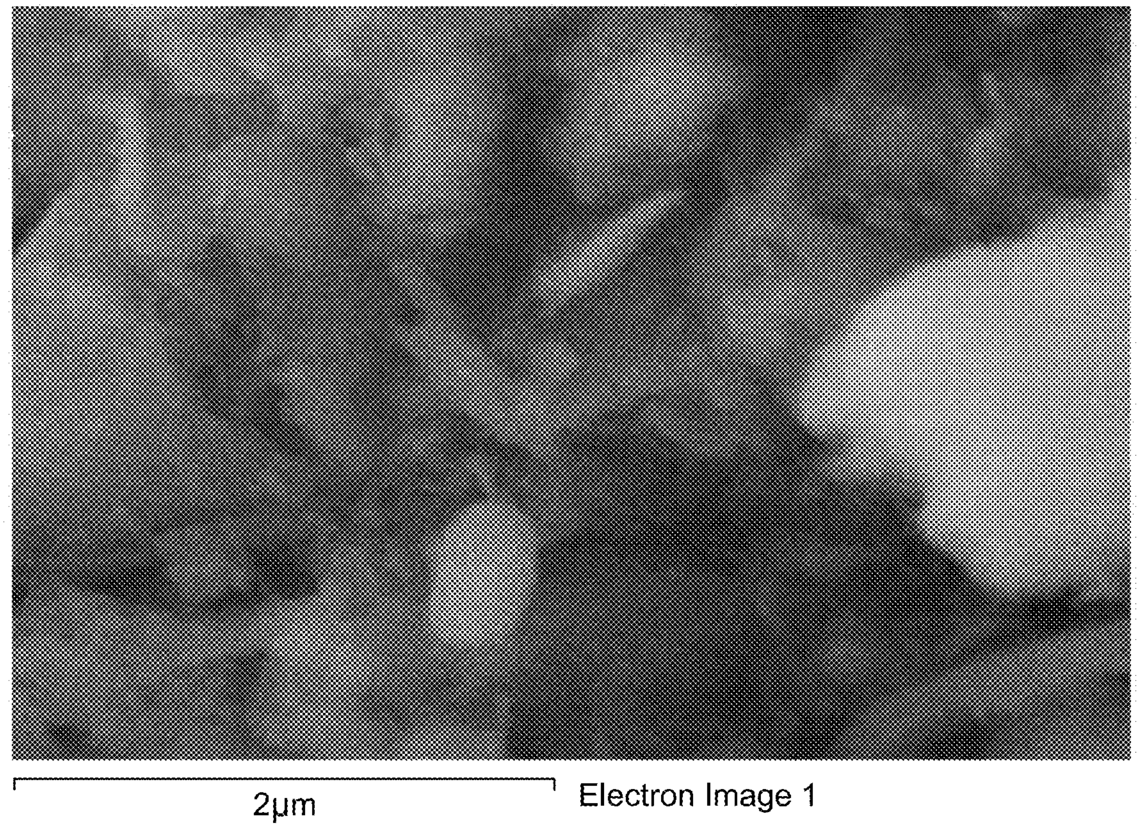
FIGS. 7A and 7B illustrate an SEM image and corresponding energy dispersive spectroscopy (EDS) spectrum of Ag@meso-C/hematite ore, according to certain embodiments.
Figure 7B:
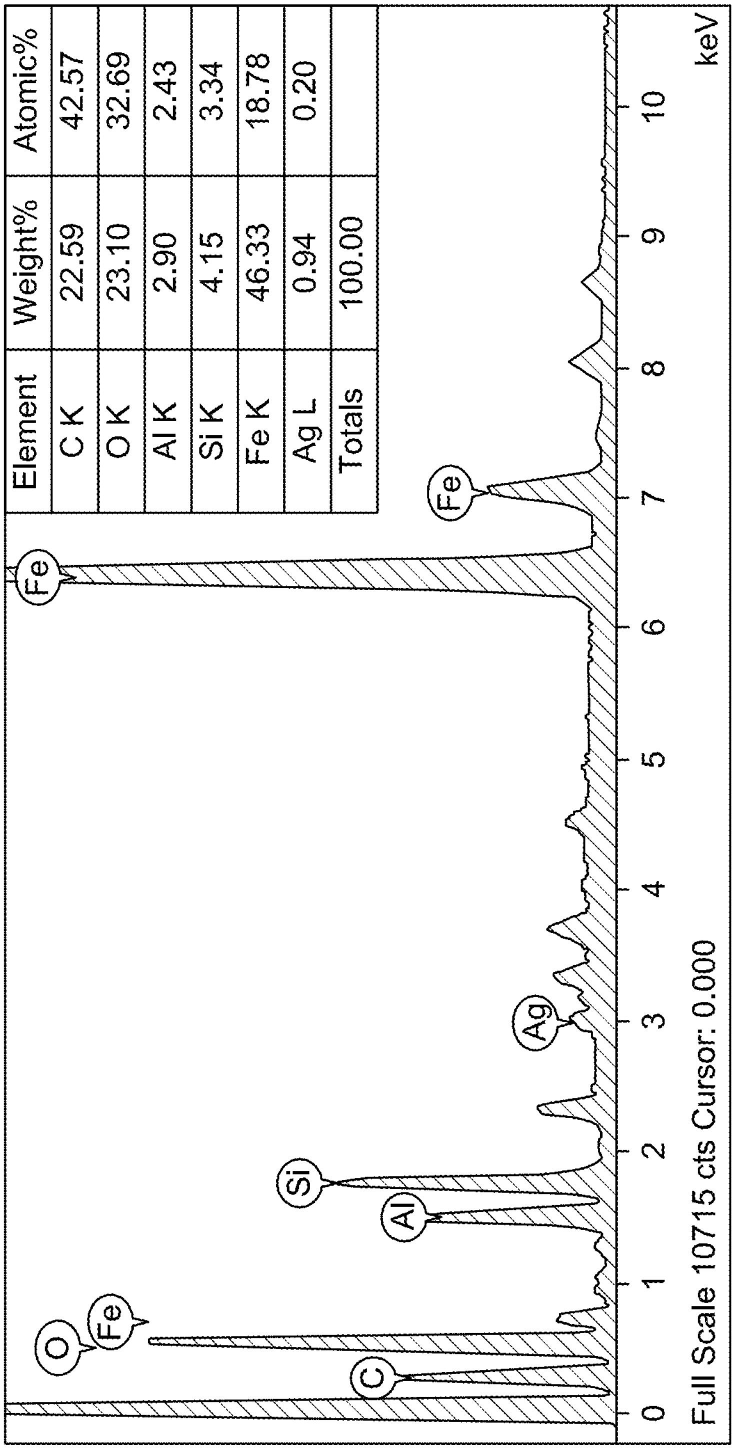
Figure 7C:
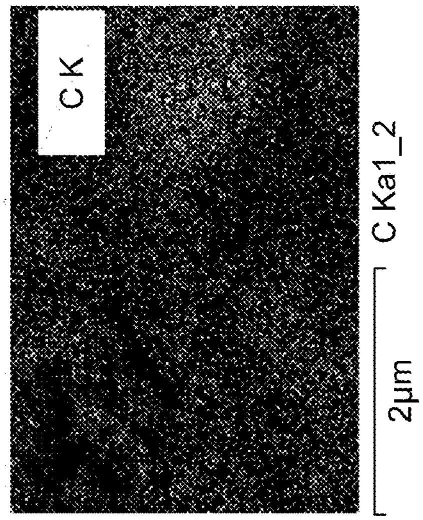
FIGS. 7C-7H represent elemental mapping of the Ag@meso-C/hematite ore nanocomposite, according to certain embodiments.
Figure 7D:
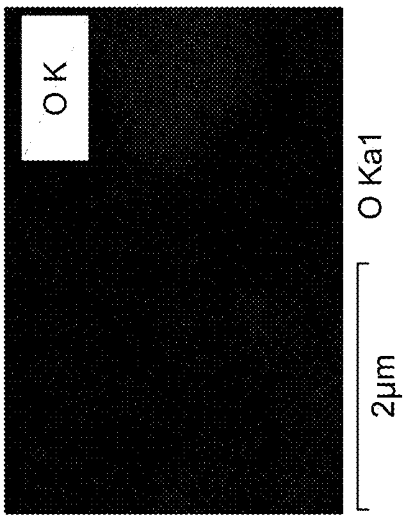
Figure 7E:
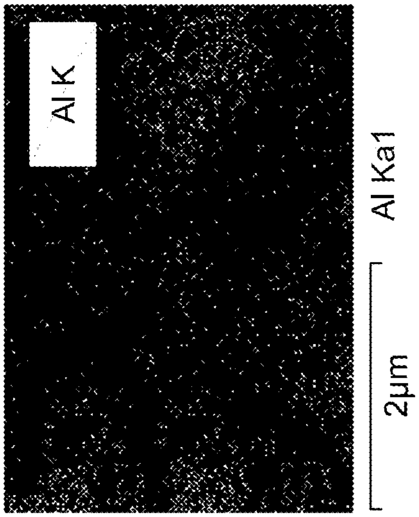
Figure 7F:
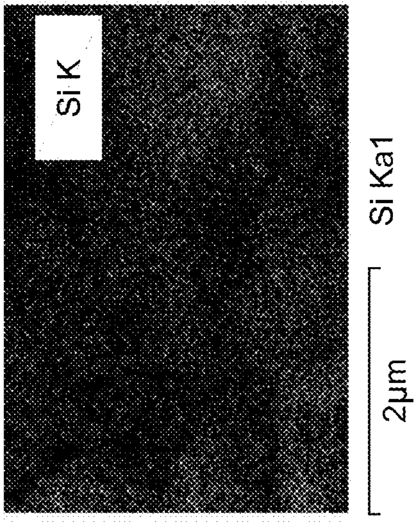
Figure 7G:
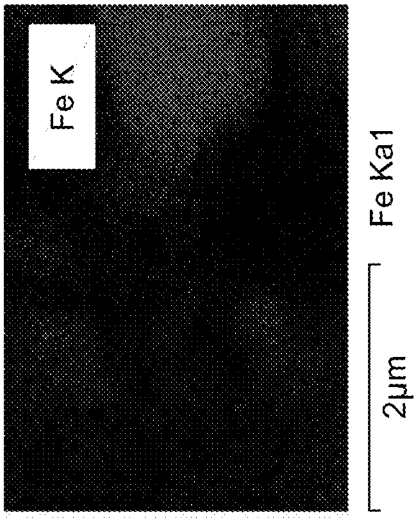
Figure 7H:
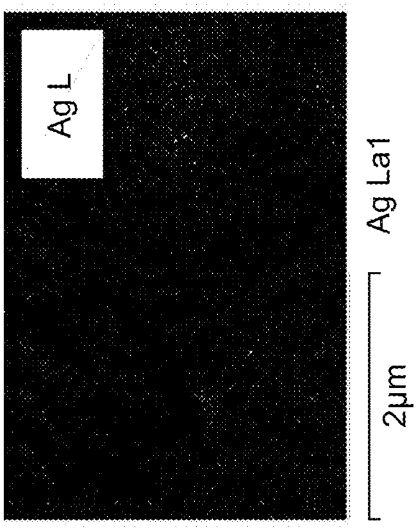

Furthermore, the EDS elemental analysis with mapping (FIG. 7A-FIG. 7H) evaluated the comparable elemental composition of the ternary nanocomposite materials. As revealed, the existence of Fe (FIG. 7G), O (FIG. 7D), C (FIG. 7C), and Ag (FIG. 7H) confirmed the formation of a hybrid nanocomposite. However, two other elements (Si (FIG. 7F) and Al (FIG. 7E)) with small ratios were also noticed in the EDS spectrum (FIG. 7B). This may be attributed to the direct use of natural ore without any chemical or heat treatment. This result is consistent with the above XRD and XPS data.

Figure 8A:
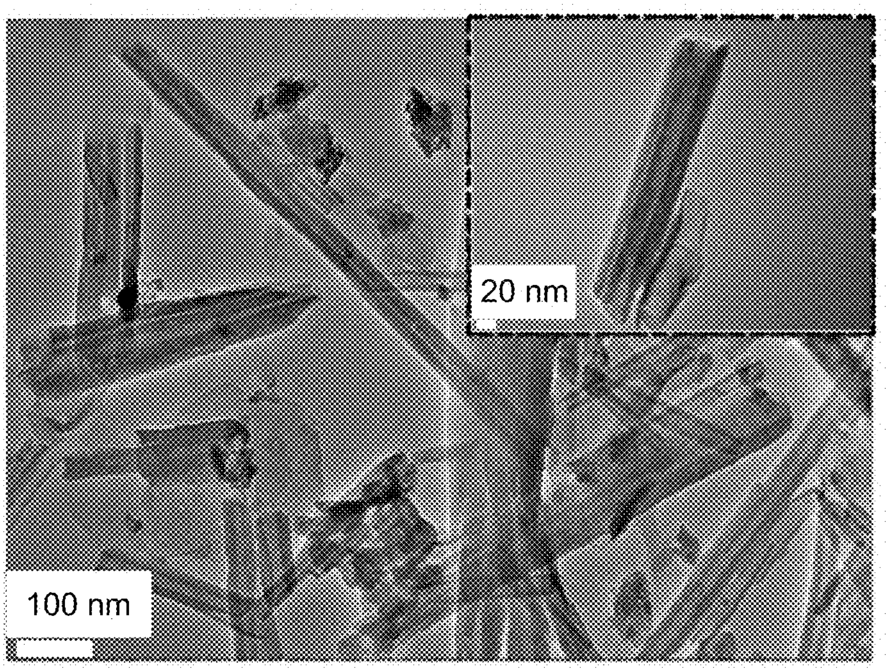
FIG. 8A illustrates transmission electron microscope (TEM) images of undoped hematite ore, according to certain embodiments.
Figure 8B:
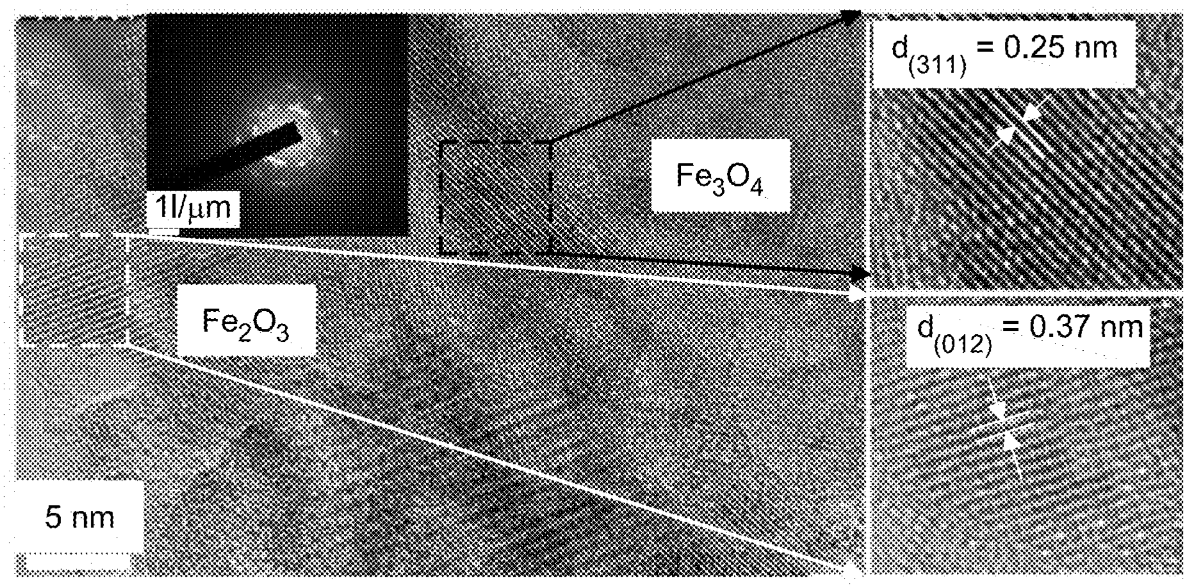
FIG. 8B shows a high-resolution transmission electron microscope (HRTEM) image of undoped hematite ore, according to certain embodiments.
Figure 8C:
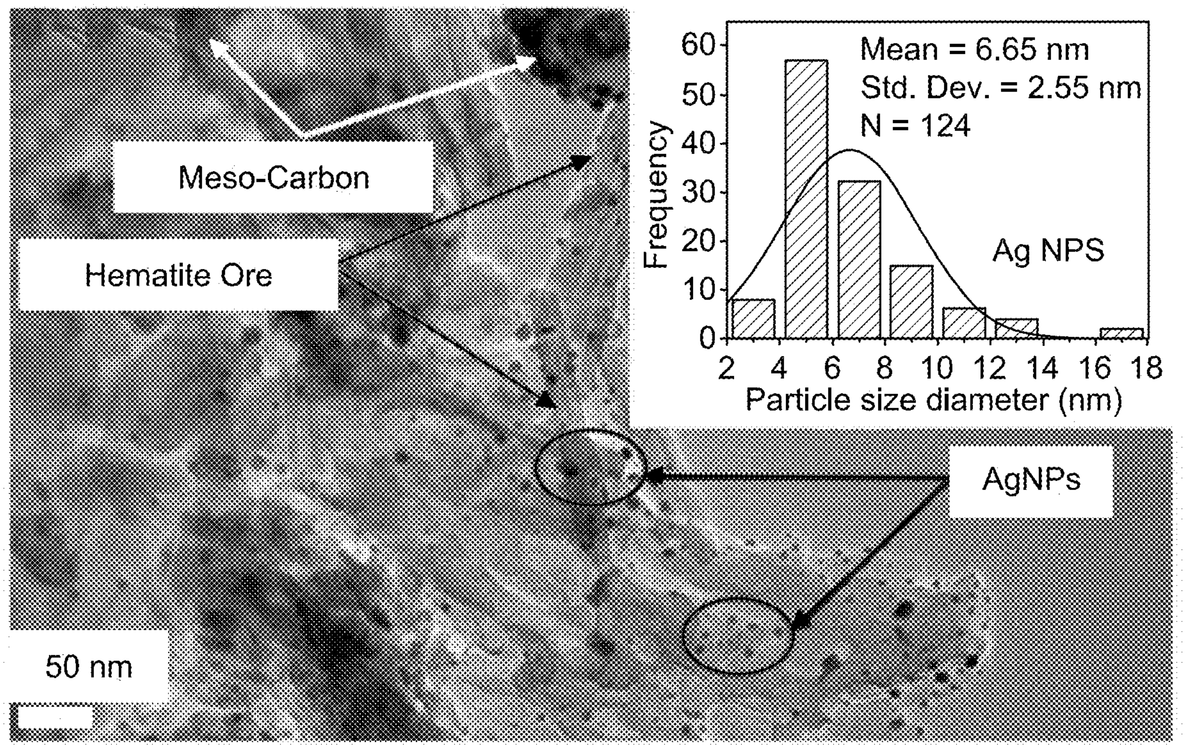
FIG. 8C shows a TEM image of Ag@meso-C/hematite ore nanocomposite and corresponding particle size distribution of the Ag nanoparticles, according to certain embodiments.
Figure 8D:
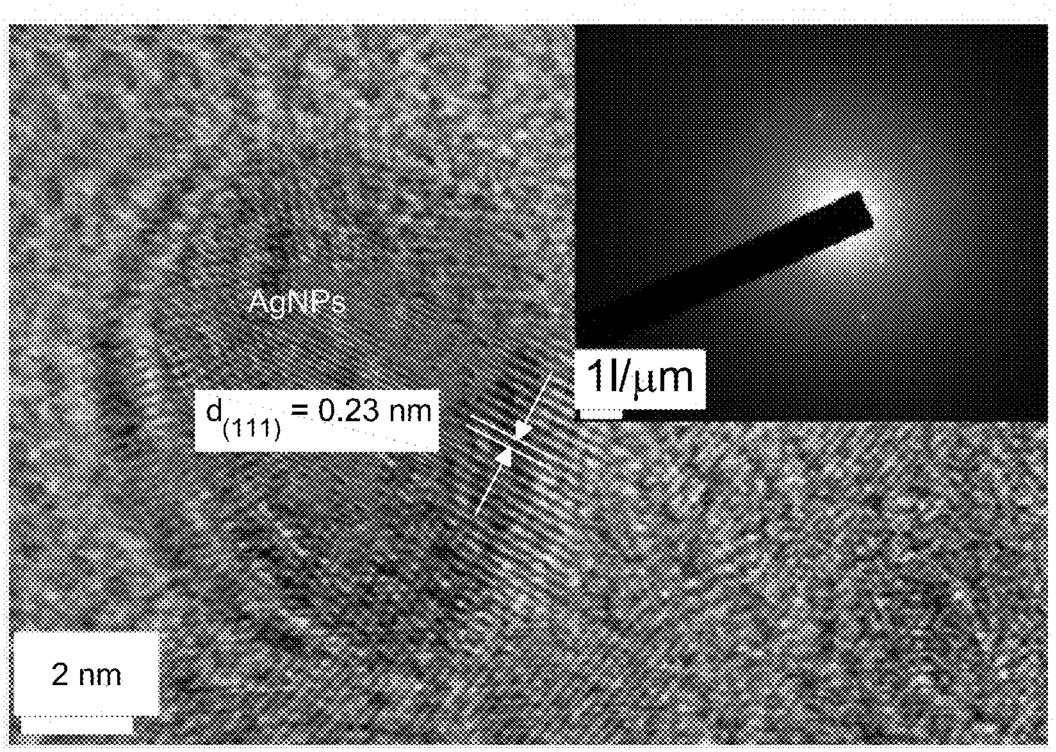
FIG. 8D shows a HRTEM image lattice fringe d-spacing of AgNPs in Ag@meso-C/hematite ore nanocomposite, according to certain embodiments.

Detailed morphology of hematite ore and the fabricated AgNPs doped nanocomposite was further examined by TEM and HR-TEM (FIGS. 8A-8D). The TEM image shows the rod-like morphology of the hematite ore. The inset of FIG. 8A displays the HRTEM image of ore nanorod morphology. The HRTEM images (FIG. 8B) reveal the inhomogeneity form of the phase separation as $Fe_2O_3$ and $Fe_3O_4$. In the microscopic view, lattice fringe spacing of 0.37 nm representing the (012) plane for $Fe_2O_3$, and 0.25 nm lattice fringe for the (311) plane of $Fe_3O_4$ could be detected. The selected area electron diffraction (SAED) image (inset of FIG. 8B) discloses the polycrystalline nature of the iron oxide in this naturally extracted ore sample. Additionally, the TEM and HRTEM images of the fabricated nanocomposite are presented in FIGS. 8C and 8D. The TEM image reflects the distribution of mesoporous carbon and AgNPs over the ore surface (FIG. 8C). The histogram demonstrated the average diameter of the spherical Ag particles as 6.65 nm with a standard deviation of 2.55 nm (inset of FIG. 8C). The HRTEM image reflects the lattice fringe of AgNPs as 0.23 nm corresponding to (111) plane of cubic Ag, which further confirmed the presence of Ag nanoparticles in the fabricated nanocomposite (FIG. 8D). As revealed from SAED pattern (inset of FIG. 8D), the crystalline nature of AgNPs is demonstrated.

Figure 9A:
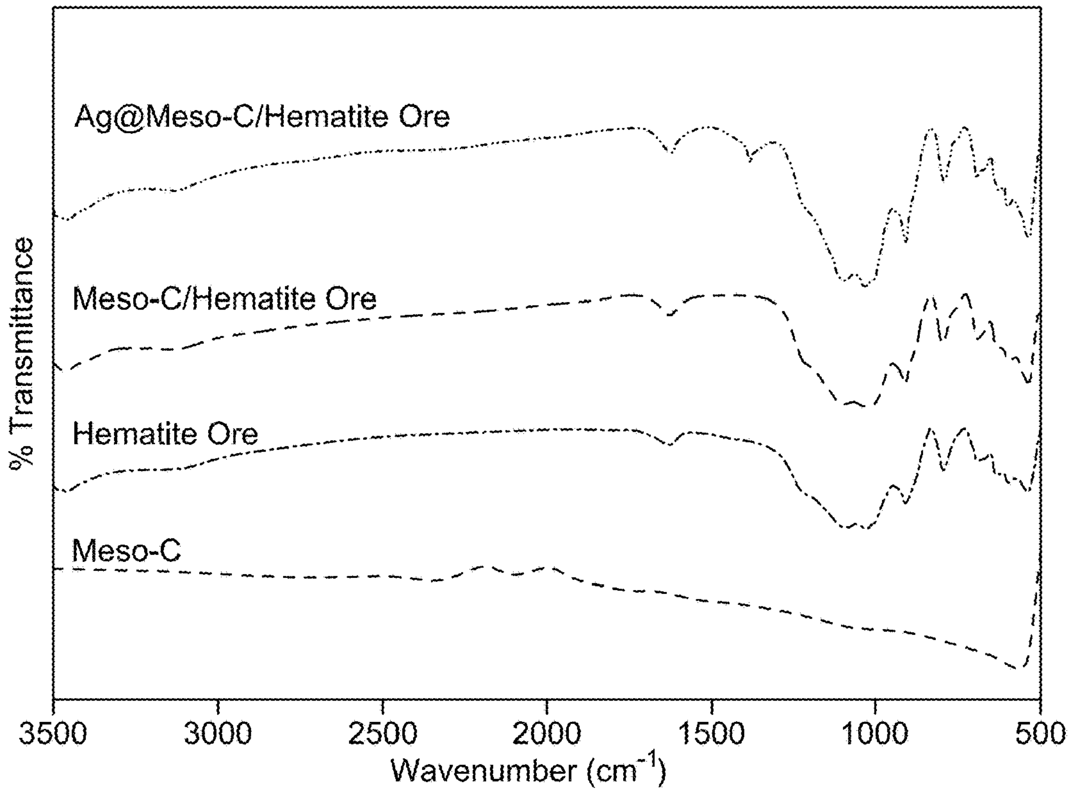
FIG. 9A shows a Fourier Transform Infrared (FT-IR) spectra of meso-C, undoped hematite ore, meso-C/hematite ore, and Ag@meso-C/hematite ore, according to certain embodiments.

The existence of functional groups in the natural hematite ore and in fabricated nanocomposite can be evaluated using FT-IR and Raman study (FIG. 9). FIG. 9A displays the FTIR spectra of meso-C, hematite ore, meso-C/hematite-Ore, Ag@meso-C/hematite ore. The IR spectrum of the mesoporous carbon sample reveals a distinguished peak at 570 $cm^{-1}$ corresponding to the C—H out-of-plane deformation mode, while the peak at ca. 2100 $cm^{-1}$ is related to the C═C stretching. In contrast, the spectrum of undoped hematite ore, meso-C/hematite ore, Ag@meso-C/hematite ore display identical IR spectra with a negligible band shift except a new weak band appeared at 1370 $cm^{-1}$ for Ag@meso-C/hematite ore nanocomposite. This peak may appear due to the interaction of AgNPs with material matrices. The peaks at 543 $cm^{-1}$, 792 $cm^{-1}$, and 912 $cm^{-1}$ are the characteristic IR peaks of Fe—O. The peak at 543 $cm^{-1}$ can be accredited to the stretching vibration of Fe—O octahedral form, which confirms the presence of iron oxide in all examined samples. The IR band at ca. 792 $cm^{-1}$ is a characteristic of maghemite Fe—O stretching vibration, which corresponds to the cationic vacancy ordering. The weak peaks at 1637 $cm^{-1}$ and 3130 $cm^{-1}$ are assigned to $CO_2$ and/or O—H bending vibration and O—H stretching vibration modes, respectively, showing the presence of —OH in the ore surface. Finally, the bands at 1175 $cm^{-1}$ and 1210 $cm^{-1}$ are linked to C—O stretching vibration of alcoholic derivatives which may enter in hematite ore due to the purification of ore before use, with the water-ethanol mixture.

Figure 9B:
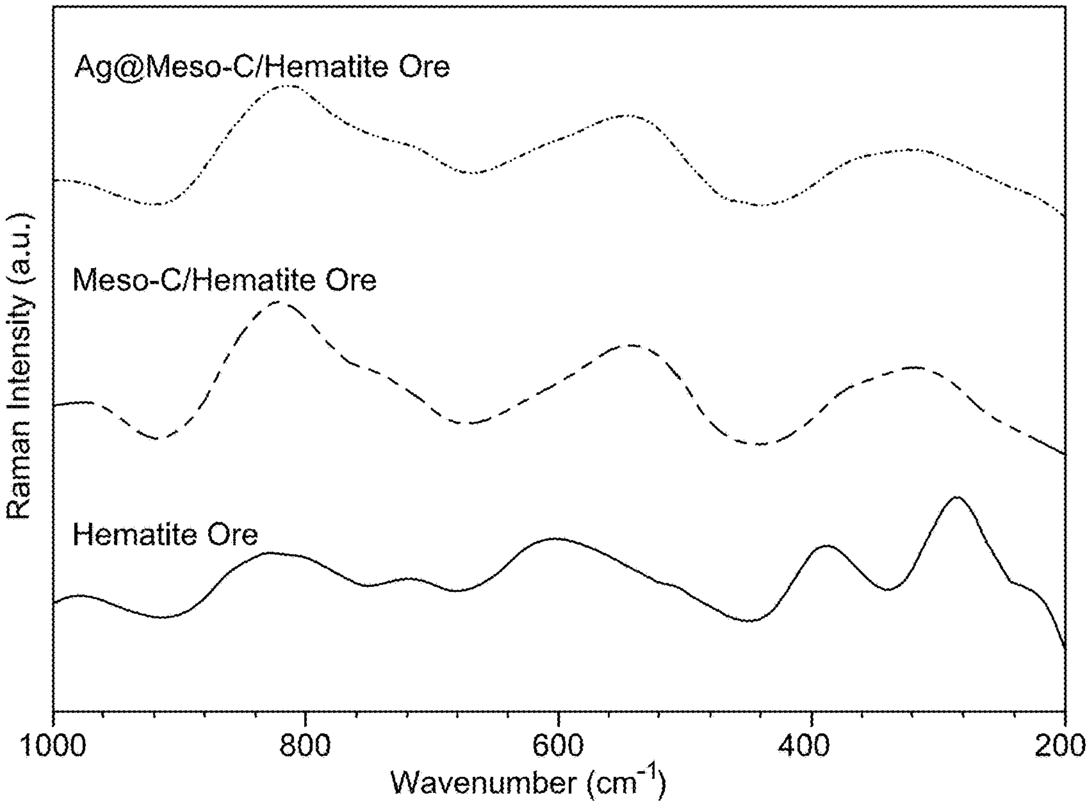
FIG. 9B shows Raman spectra of undoped hematite ore, meso-C/hematite ore, and Ag@meso-C/hematite ore, according to certain embodiments.

In Raman spectra, as can be observed in FIG. 9B, the undoped hematite ore exhibits several Raman bands at 223 $cm^{-1}$, 280 $cm^{-1}$, 395 $cm^{-1}$, 609 $cm^{-1}$, and 833 $cm^{-1}$. The band at 223 $cm^{-1}$ is assigned to Raman active A1g mode, reflecting the crystallographic C-axis movement of iron cation. The Raman active $E_g$ bands at 280 $cm^{-1}$, 395 $cm^{-1}$, and 609 $cm^{-1}$ reflect the symmetric breathing mode of oxygen atoms, which are associated with each iron cation placed in the perpendicular direction to the C-axis. Furthermore, the Raman band at 830 $cm^{-1}$ is due to the second harmonic mode for the typical hematite form of α-$Fe_2O_3$. However, this band is slightly red shifted due to the impure form of hematite ore. In contrast, the bands are shifted, abolished/overlapped without the formation of any new band in the doped samples (meso-C/hematite ore, Ag@meso-C/hematite ore), indicating the formation of hybrid materials.

Example 6: Electrochemical Behavior of IMC

Figure 10A:
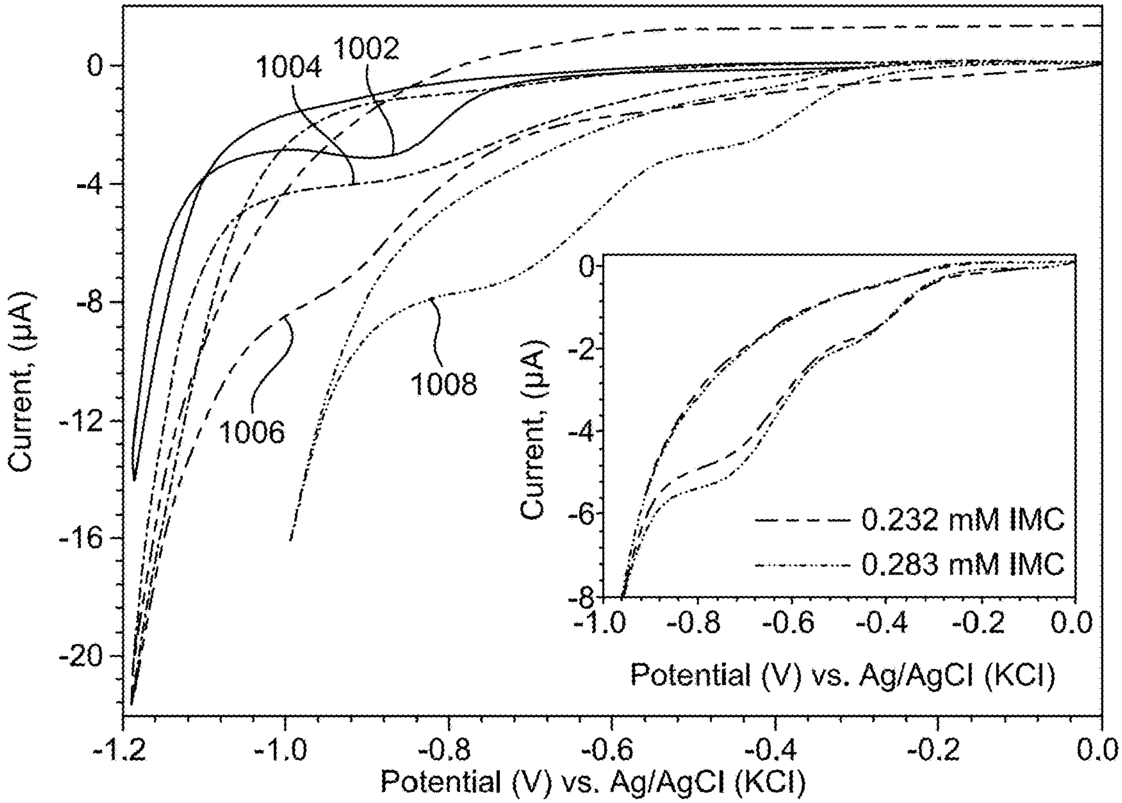
FIG. 10A is a cyclic voltammogram (CVs) measured at a bare glassy carbon electrode (GCE), hematite ore/GCE, meso-C/hematite ore/GCE, and Ag@meso-C/hematite ore/GCE in phosphate buffer solution (0.1 M PBS: pH=6.60) containing 0.365 millimolar (mM) of imidacloprid at a potential scan rate 20 $mVs^{-1}$, according to certain embodiments.

The electrochemical reduction behavior of IMC was investigated using cyclic voltammetry (CV). FIG. 10A shows the voltammograms of IMC electro-reduction at bare GCE, hematite ore/GCE, meso-C/hematite ore/GCE, and Ag@meso-C/hematite ore/GCE measured in 0.365 mM IMC+0.1 M PBS (pH=6.60) at a scan rate of 20 $mVs^{-1}$. The voltammogram of bare GCE (1002) displays a weak reduction wave at a potential—0.87 V because of the electrochemical reduction of —$NO_2$ group in IMC, while curves (1004) and (1006) for hematite ore/GCE, and meso-C/hematite ore/GCE demonstrate a higher reduction current compared with unmodified GCE at a similar potential region. However, among these three examined electrodes, the meso-C/hematite ore/GCE shows the highest current intensity, which is probably due to the enhanced conductivity of the modified electrode which could lead to facilitating the reduction process.

Interestingly, 1 wt % Ag-doped meso-C/hematite Ore/GCE (1008) shows a significant increase in electrocatalytic activity. Ag-doped electrode exhibits almost twice the current intensity compared to bare GCE and hematite ore/GCE electrodes. Though the Ag-doped meso-C/hematite ore shows similar current intensity as undoped meso-C/hematite ore modified GCE, the Ag@meso-C/hematite ore/GCE exhibits ca. 150 mV lower overpotential (−0.72 V) than its counterparts. The reduction potential (−0.72 V vs. Ag/AgCl) obtained by the ternary nanocomposite electrocatalyst of the present disclosure is significantly lower than most reported catalysts for the electrochemical detection of IMC. Therefore, it may be concluded that the Ag@meso-C/hematite ore electrocatalyst shows brilliant catalytic activity towards IMC electro-reduction process. The improvement in electrocatalytic efficiency may be due to the improvement of active surface area and conductivity by including carbon nanomaterials in the hematite ore. In addition, the host matrix prevented the aggregation of doped AgNPs, which is a prominent catalyst to facilitate the charge transfer through the electrode/solution interface, ultimately boost up the electrocatalytic performance. However, two distinguished reduction waves appeared at −0.43 V and −0.72 V vs. Ag/AgCl in the case of Ag@meso-C/hematite ore/GCE.

Compared with other voltammograms (1002, 1004, and 1006) the peak at −0.72 V is likely related to the reduction of the —$NO_2$— group in IMC. The inset of FIG. 10A displays the voltammograms of Ag@meso-C/hematite ore/GCE electrode measured in two different concentrations (0.232 mM and 0.283 mM) of IMC under identical experimental conditions. As revealed, the resulting peak at −0.72 V is significantly enhanced with increasing the IMC concentration, whereas no significant change of peak current was observed with −0.43 V peak. This phenomenon will be further addressed with the current vs. concentration measurement (FIG. 13A), in which the peak at ca. −0.72 V gradually increases with increasing the IMC concentration, whereas the saturation of peak current was observed at −0.43 V potential. The effect of electrolyte pH on the electro-reduction of IMC (0.365 mM) using the active ternary Ag@meso-C/hematite ore modified GC electrode was examined in the pH range 5.35-9.00 at a potential scan rate 10 $mVs^{-1}$.

Figure 10B:
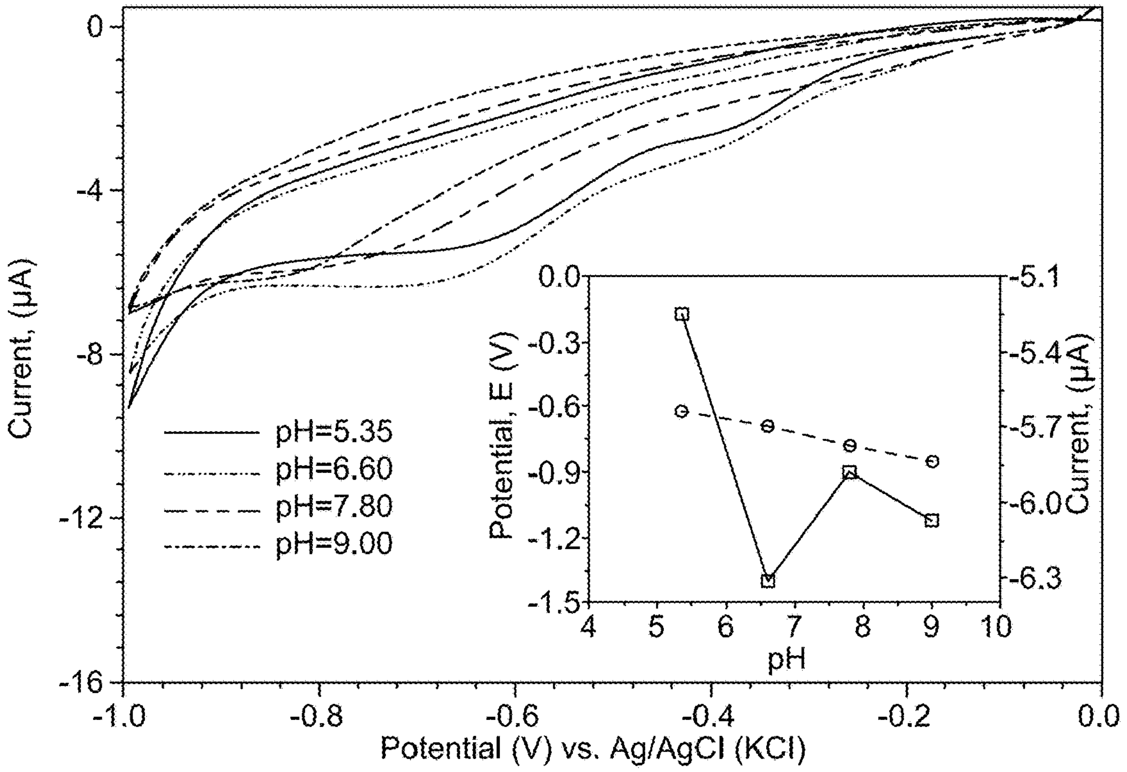
FIG. 10B illustrates CVs of the Ag@meso-C/hematite ore/GCE at different pH values (5.35-9.00) in 0.365 mM of IMC at scan rate 10 $mVs^{-1}$, according to certain embodiments.

The CVs in FIG. 10B suggest that not only the alteration of peak current with changing electrolyte pH, but also peak potential shifted towards the higher negative value. The peak current significantly increases with pH increase from pH 5.35-6.60, after that a decrease of peak current at higher pH value was detected. This may occur because of the hydrolysis of IMC nitro guanidine functional group in basic condition. In contrast, in basic pH, the peak at −0.43 V was not visible, whereas in acidic pH, the current intensity at −0.43 V was not changed with changing the pH. Thus, it may be concluded that the weak cathodic peak at ca. (−0.43 V) is generated due to the adsorption of IMC onto the electrode surface in acidic condition, the result of concentration changes. Finally, according to the sensitivity parameter (in terms of current intensity and overpotential), the pH 6.60 value was selected for further electrochemical and sensing analysis of IMC. The inset of FIG. 10B shows the dependence of reduction peak potential (Ep) and peak current ($I_p$) to the solution pH. The reduction peak potential ($E_p$) of IMC at the Ag@meso-C/hematite ore/GCE electrode exhibits a straight line (regression coefficient $r^2$=0.994) with the variation of pH, suggesting that the IMC electro-reduction process is a proton dependence. The relationship between $E_p$ and pH is shown in Eq. (i) based on Nernst Equation.

$$E_p = \frac{-0.0592\ m}{n} pH + \text{constant} \qquad \text{Eq. (i)}$$

where, the symbols "m" and "n" represent the number of proton and electron participating in the reduction reaction, respectively.

From $E_p$ vs. pH plot (Inset of FIG. 10B), the obtained slope value is −0.064 V/pH. This value is very close to the expected value (0.0592 V/pH) for monoelectronic/monoprotonic electrode reaction which implies that the number of electrons and protons are equal in this IMC electroreduction process.

Figure 11:
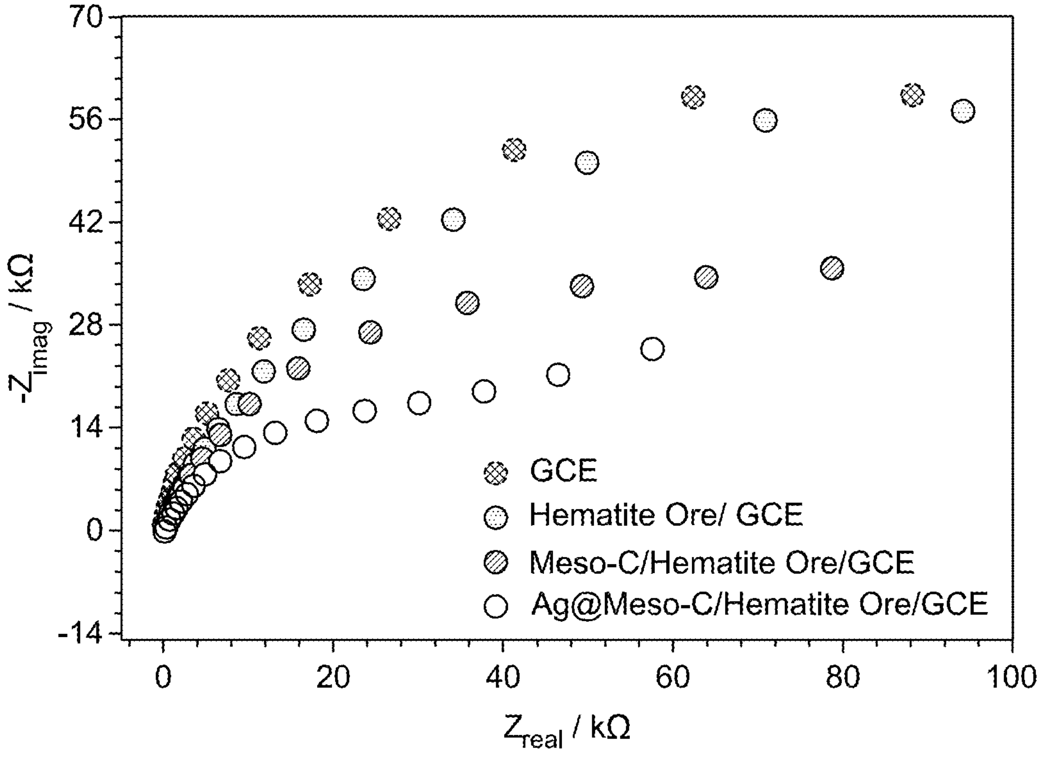
FIG. 11 illustrates electrochemical impedance spectroscopy (EIS) Nyquist plots measured at bare GCE, hematite ore/GCE, meso-C/hematite ore/GCE, and Ag@meso-C/hematite ore/GCE in phosphate buffer solution (0.1 M PBS: pH=6.60) containing 0.365 mM of IMC at a potential of −0.7V, a signal amplitude of 10 mV, frequency range 10-2 to 105 Hz, according to certain embodiments.

The catalytic efficiency of the Ag@meso-C/hematite ore/GC electrode was further investigated using the EIS technique (FIG. 11). From EIS investigation, the meso-C/hematite ore and Ag@meso-C/hematite ore modified GC electrodes, demonstrate fast electron transfer kinetics and higher conductivity with lower semicircle diameter in higher frequency region. However, among all examined electrodes, the Ag@meso-C/hematite ore/GCE exhibits the lowest semicircle diameter, implying the highest conductivity. Based on the above electrochemical investigation (CV and EIS), it was observed that the ternary nanocomposite electrocatalyst exhibits the highest electrocatalytic efficiency towards IMC electrochemical reduction under the above-mentioned experimental conditions.

Figure 12A:
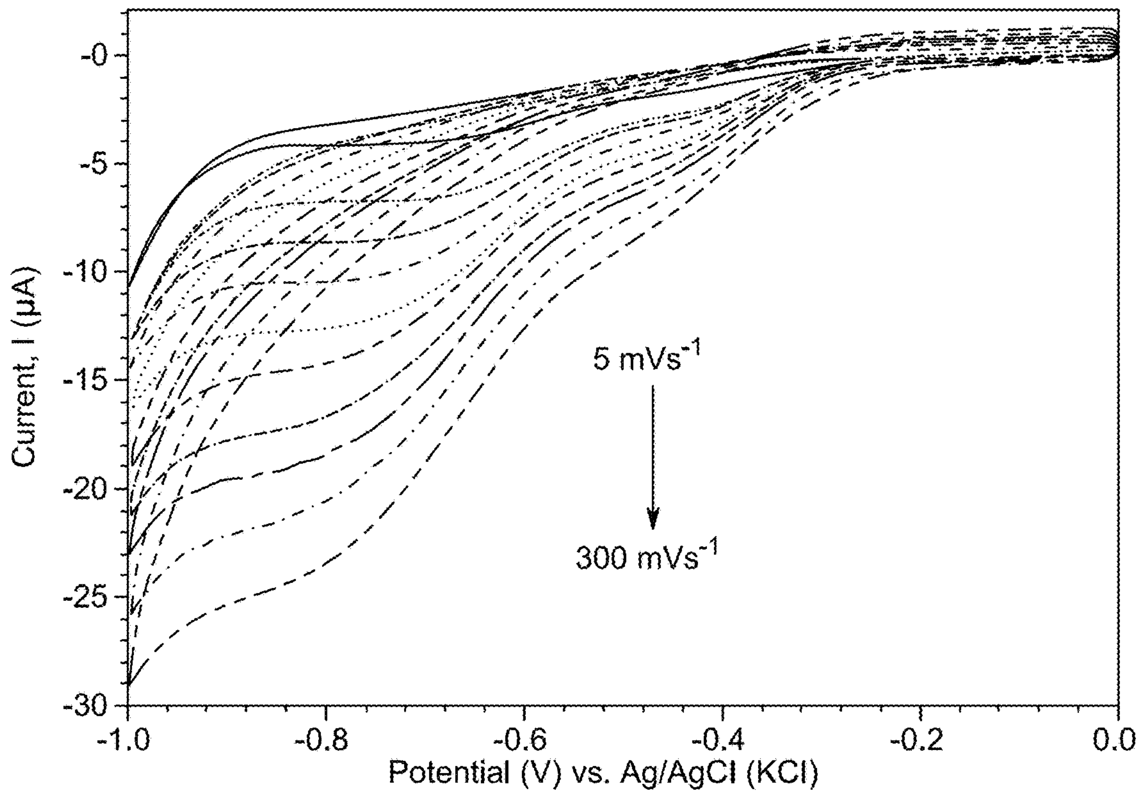
FIG. 12A is a CV of 0.337 mM of IMC in 0.1 M PBS (pH=6.60) at Ag@meso-C/hematite ore/GCE with varying scan rate of 5-300 $mVs^{-1}$, according to certain embodiments.
Figure 12B:
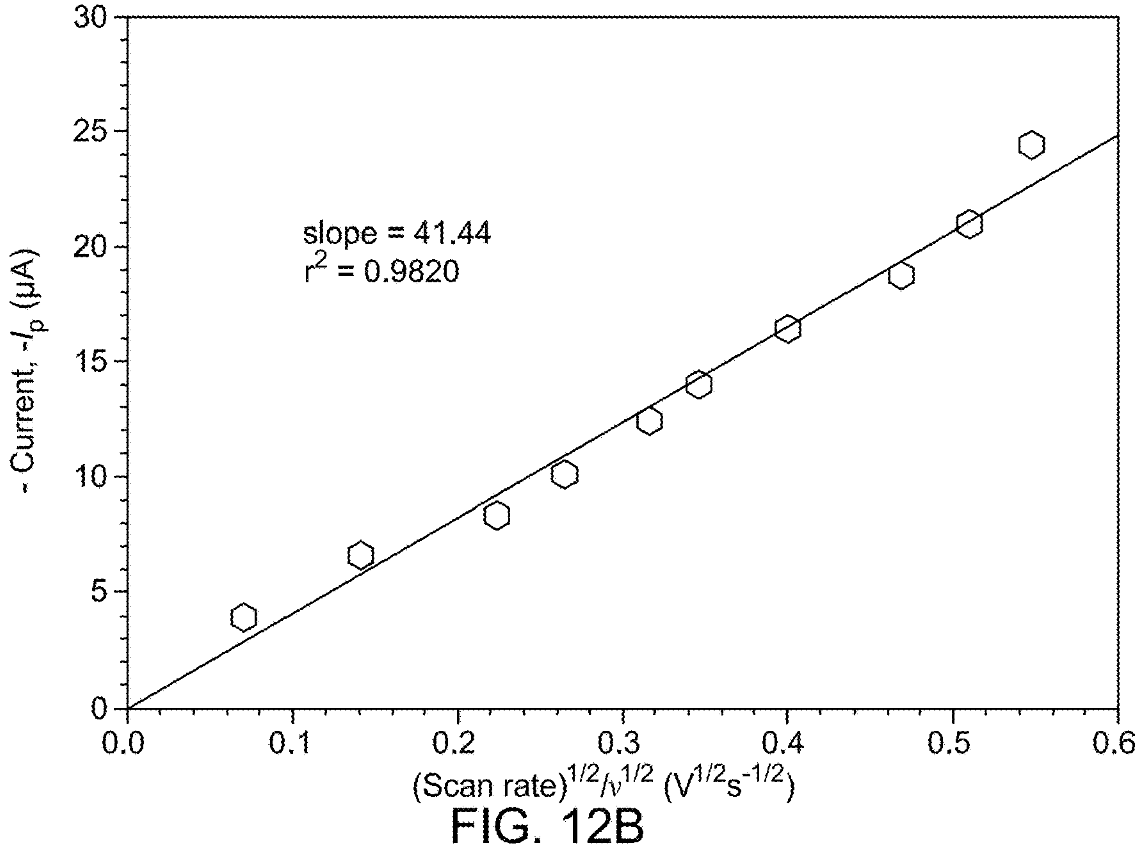
FIG. 12B depicts a relationship of peak current ($I_p$) vs. square root of scan rate ($v^{1/2}$), according to certain embodiments.
Figure 12C:
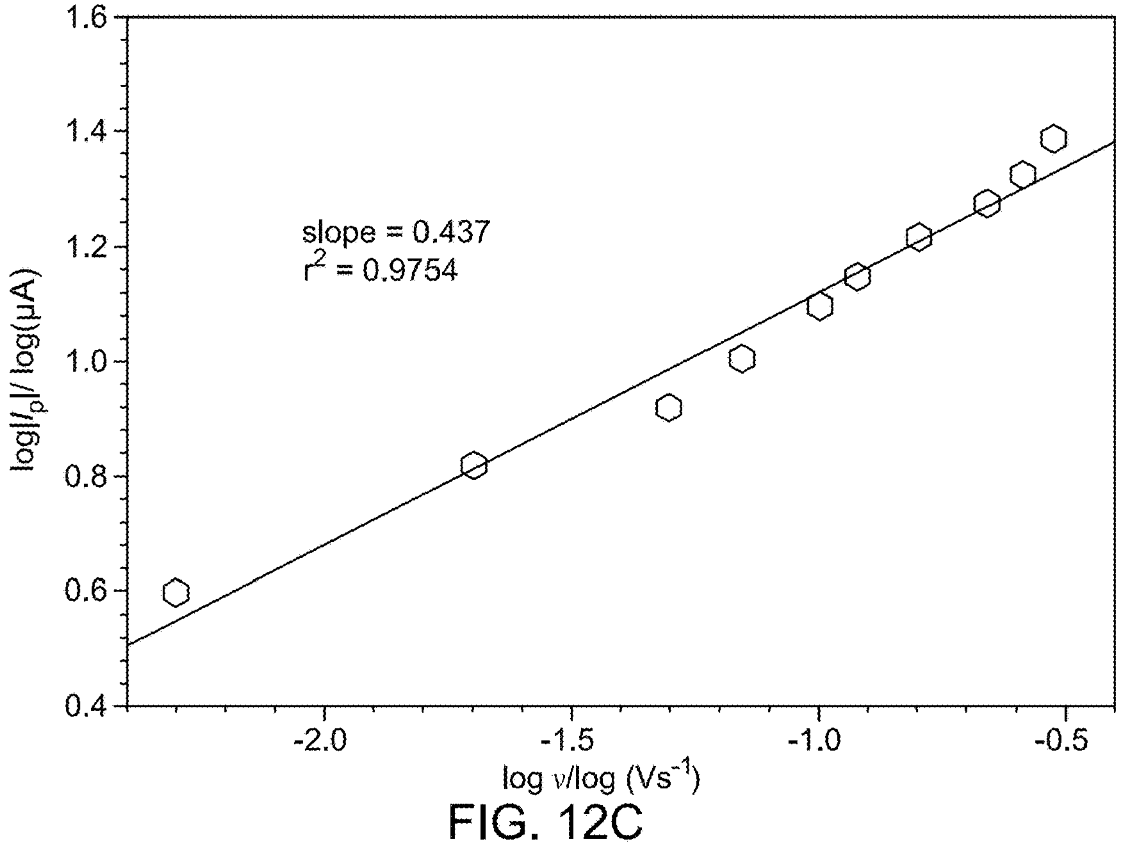
FIG. 12C is a plot of a log of peak current (log $I_p$) vs. log scan rate (log y), according to certain embodiments.
Figure 12D:
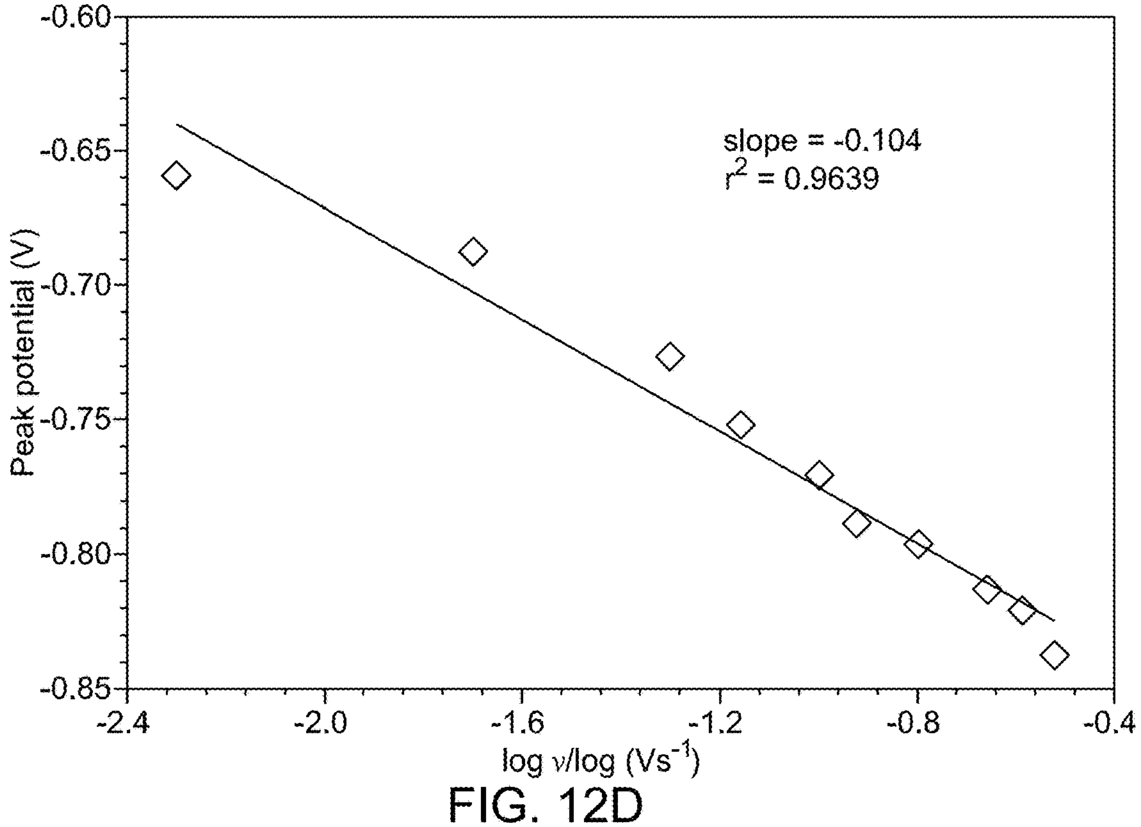
FIG. 12D depicts a relationship between peak potential ($E_p$) vs. log scan rate (log y), according to certain embodiments.

The effect of changing the scan rate to define the electrochemical parameters can be presumed by the relationship between peak current ($I_p$), peak potential ($E_p$), and scan rate ($Vs^{-1}$). The electrochemical reduction of IMC (0.337 mM) on Ag@meso-C/hematite ore/GCE electrode was investigated by varying the scan rates from 5 to 300 $mVs^{-1}$ in 0.1 M PBS (pH=6.60). The results of this study are depicted in FIG. 12A. The shift in reduction peak towards negative potential direction with changing the scan rate was observed, signifying the irreversible electrochemical process of IMC electro-reduction. The plot of peak current ($I_p$) vs. square root of scan rate ($v_{1/2}$). (FIG. 12B) illustrates a linearity with $r^2$=0.98, demonstrating the IMC reduction reaction is a diffusion-controlled process. In addition, the plot of log (Ip) vs. log (v), as can be observed in FIG. 12C, provides the slope value 0.437, which further indicates the diffusion control kinetics of the reduction reaction. In order to acquire further information such as electron transfer co-efficient (a) and the electrons involved in the rate-determining step, Tafel slope (b) analysis was done using the relationship of peak potential ($E_{pc}$) vs. log scan rate (log v), as can be observed in FIG. 12D, according to the following equation:

$$E_{pc} = \left(\frac{b}{2}\right) \log v \qquad \text{Eq. (ii)}$$

The slope value of $E_{pc}$ vs. log v was found to be 104.0 mV/decade and the Tafel slope (b) was estimated to be 208 mV/decade, indicating a one electron transfer in the rate-determining step. Then, the electron transfer co-efficient (a) between IMC and Ag@meso-C/hematite ore/GCE was evaluated by applying the value of Tafel slope (b) according to the following equation.

$$b = \frac{2.303\ RT}{\alpha n_\alpha F} \qquad \text{Eq. (iii)}$$

From this equation, a is estimated to be 0.284, where the electron in the rate-determining step (nα) is assumed to be 1.

Finally, Randles-Sevcik equation (Eq. (iv)) was applied in order to define the number of electrons participated in the totally irreversible diffusion-controlled process using the slope value of $I_p$ vs. $v^{1/2}$ (FIG. 12B)

$$I_p = (2.99 \times 10^5) n (\alpha n_\alpha)^{\frac{1}{2}} A C_0 D_0^{\frac{1}{2}} \cdot v^{\frac{1}{2}} \qquad \text{Eq. (iv)}$$

where, $C_0$ is the IMC concentration (mol $cm^{-3}$), A is the electrode surface area (0.071 $cm^2$), Do is the diffusion co-efficient (7.2×10-6 $cm^2s^{-1}$). From Eq. (iv), the number of electron transfer was estimated to be 4.05, signifying that the reduction of IMC is a four-electron transfer process. The nitro-aromatic compounds are reduced and generate hydroxylamine derivatives via a two steps using four electrons and four protons transfer process as indicated in step 1-2 of the diagram below. The first step is a slow (rate-determining step) and undergoes one-electron transfer (n=1). In the second step, the concentration of protons will influence the reaction rate. This proposed mechanism is also supported by the result obtained from the pH variation as discussed above, implying that the ratio of electrons and protons is probably one.

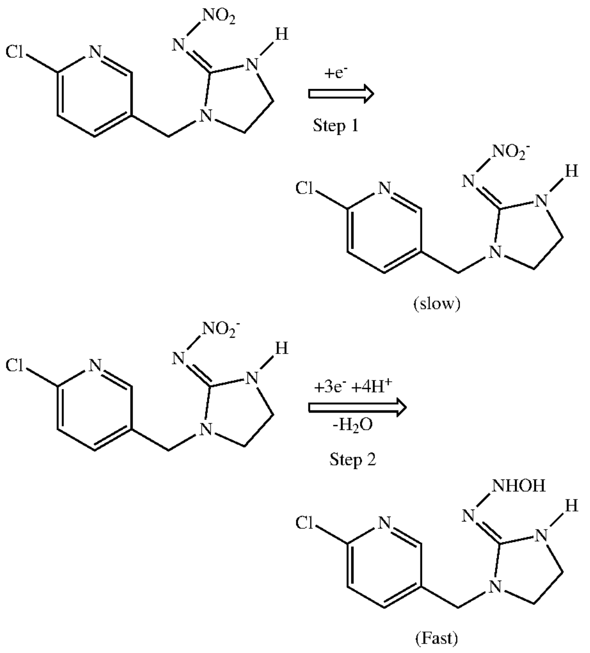

Example 7: Analytical Performance of the Imidacloprid Sensor

Figure 13A:
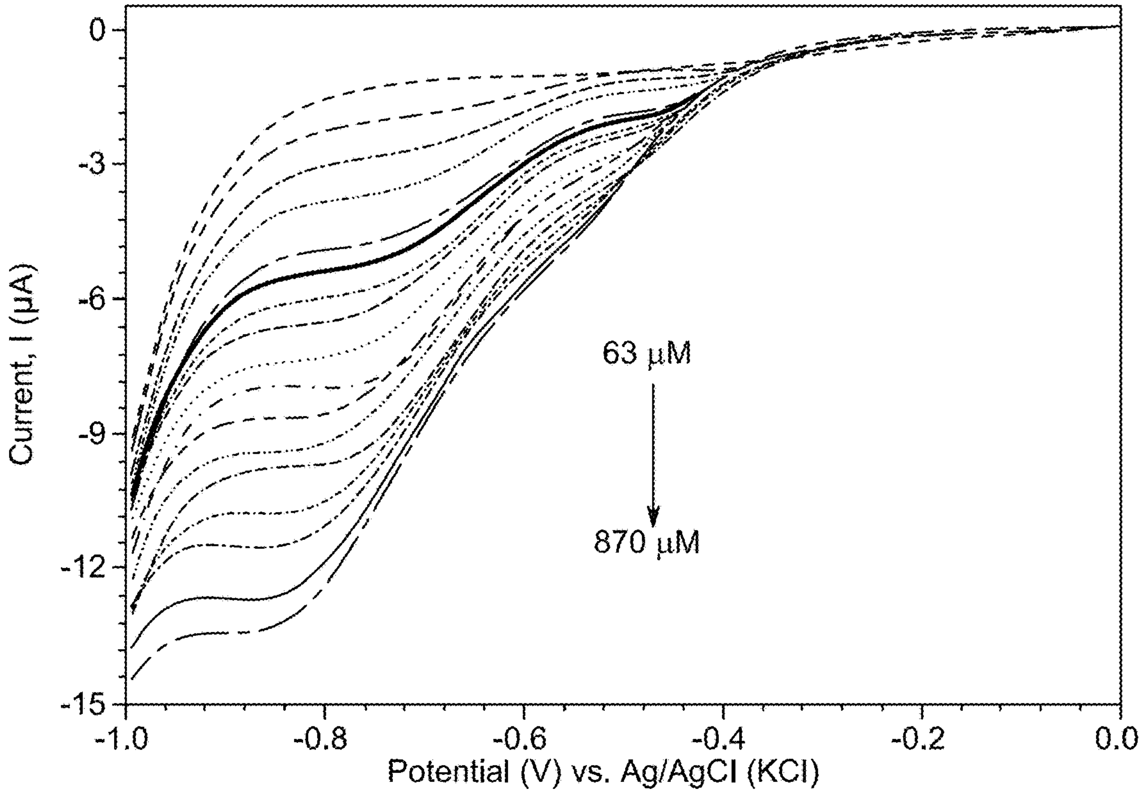
FIG. 13A depicts linear sweep voltammetry (LSV) responses of Ag@meso-C/hematite ore/GCE electrode as a function of IMC concentration in 0.1 M PBS (pH=6.60) at scan rate 20 $mVs^{-1}$, according to certain embodiments.
Figure 13B:
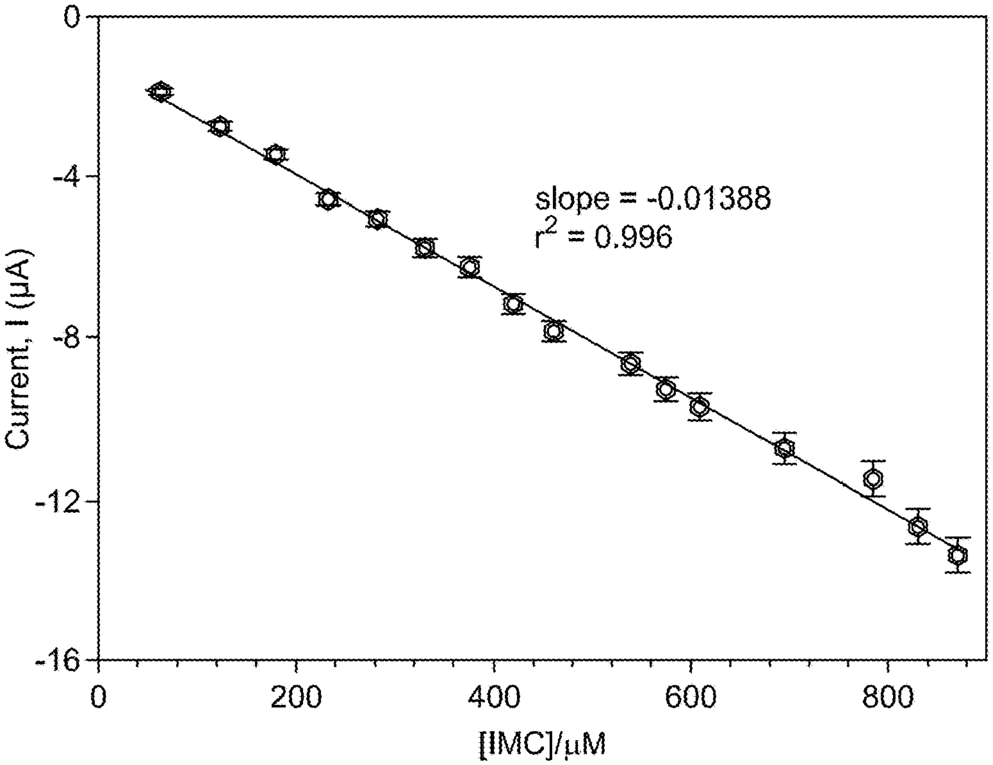
FIG. 13B is a plot depicting a reduction current vs. IMC concentration calibration plot, according to certain embodiments.

The analytical performance of the electrochemical sensor was also evaluated. The catalytic activity of the Ag@meso-C/hematite ore towards IMC electro-reduction could enable its use as a sensor material for IMC detection in an aqueous medium. The analytical performance of the sensor was simultaneously investigated using LSV and amperometric (i-t) techniques. FIG. 13A shows the LSV's at different IMC concentrations (63 μM to 870 μM) in 0.1 M PBS (pH-6.60) at a potential scan rate 20 $mVs^{-1}$. As noticed, the peak current progressively rises with the successive addition of IMC in a reaction vessel, signifying the sensing ability of the fabricated ternary nanocomposite electrocatalyst. However, a slight shift in peak towards the negative potential direction with the increase of concentration was observed due to the adsorption of IMC onto AgNPs surface. FIG. 13B displays the linear relationship of peak current vs. IMC concentration (0.063-0.870 mM) with the following calibration Eq. (v).

$$I(\mu A) = -\frac{0.01388[IMC]}{\mu M} - 1.154(r^2 = 0.996) \quad \text{Eq. (v)}$$

From Eq. (v), the slope value is obtained as 0.01388 $\mu A \mu M^{-1}$. The sensor sensitivity was evaluated by dividing this slope by the electrode surface area (0.071 $cm^2$) and found to be 0.1955 $\mu A \mu M^{-1}$ $cm^{-2}$. Finally, Eq. (vi) was used to obtain the detection limit for IMC:

$$\text{Detection limit} = \frac{3S_b}{m\left(\frac{S}{N} = 3\right)} \quad \text{Eq. (vi)}$$

where, m is the slope value of current vs. concentration plot and $S_b$ represents the standard deviation of five blank (0.1 M PBS (pH=6.60)) measurements and the current is amounted to be 0.004938 μA. The detection limit was found to be 1.06 μM. Since a large background current was detected in the above LSV measurements a highly sensitive and reliable electrochemical technique, amperometric (i-t) was further applied for the sensing of IMC.

Figure 14A:
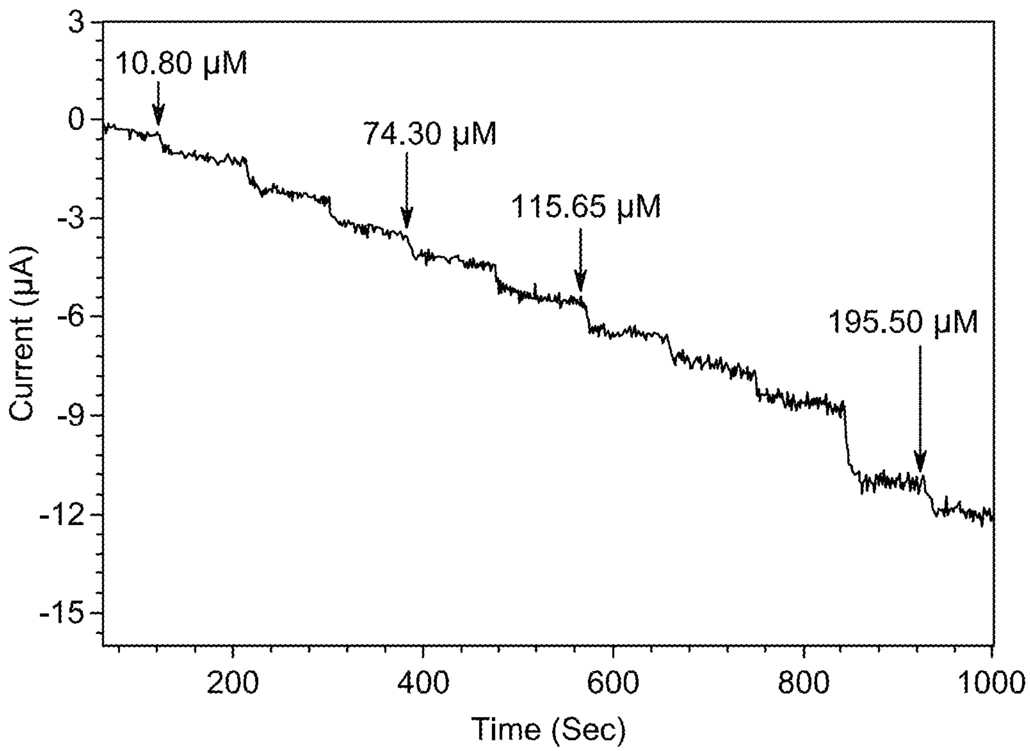
FIG. 14A is an amperometric (current-time (i-t)) response of Ag@meso-C/hematite ore/GCE to successive addition of IMC in 0.1 M PBS (pH=6.60) at a working potential −0.7 V vs. Ag/AgCl (KCl), according to certain embodiments.

The amperometric measurement was performed in 0.1 M PBS (pH=6.60) solution at a constant applied potential (−0.7 V) under constant stirring within the IMC concentration range (10.80 μM-195.50 μM), as can be observed in FIG. 14A. The rapid current response ≤10 s after each injection of IMC is an indication of an effective sensor response of the fabricated sensor material. However, in higher IMC concentration regimes, the tendency of current drift was observed.

Figure 14B:
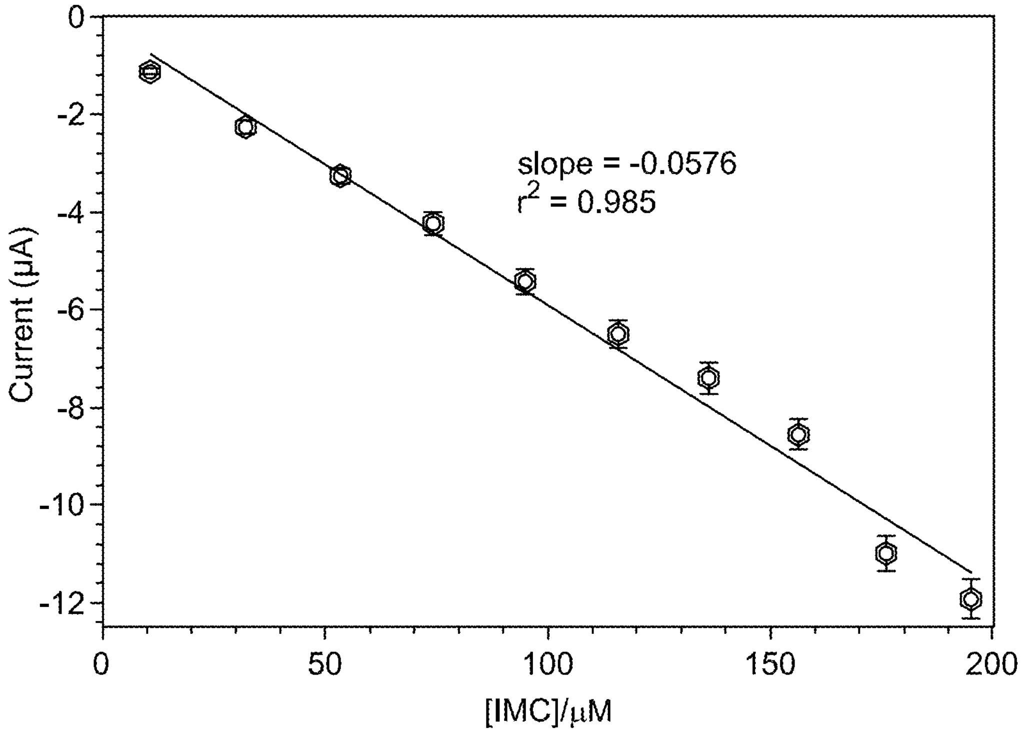
FIG. 14B is a current vs. IMC concentration calibration plot, according to certain embodiments.

FIG. 14B depicts the linear relationship of the amperometric current vs. analyte concentration with the following calibration equation:

$$I(\mu A) = -\frac{0.0576[IMC]}{\mu M} - 0.148(r^2 = 0.985) \quad \text{Eq. (vii)}$$

The sensor sensitivity and detection limit were estimated to be 0.8113 μAμM-1 cm-2 and 0.257 μM applying the above Eq. (vi).

The CV response in FIG. 10A depicts the current response noticeably enhanced in hematite ore/GCE electrode (1004), compared to bare, unmodified GCE (1002). This observation implies that the IMC sensing mechanism is dominantly governed by the n-type semiconductor $Fe_2O_3$ (hematite ore). Moreover, the current response was enhanced after the meso-C was doped into the hematite ore such as meso-C/hematite ore/GCE sensor electrode (1006), indicating a contribution of carbon nanomaterials to the IMC sensing event. Due to the interaction of the p-type meso-C and the n-type $Fe_2O_3$, a solvation and adsorption onto the nanocomposite may occur. Additionally, in case of incorporation of Ag nanoparticles into the meso-C/hematite ore nanocomposite, FIG. 10A, a shifting in the reduction peak at ca. 150 mV towards the more positive potential direction was detected (1008). Therefore, AgNPs catalyzed the IMC reduction process by significantly lowering the overpotential of the reduction reaction. Moreover, it is well-established that metal and metal oxide nanoparticles play a role in the nitro compound reduction process. As a result, the combination of metallic Ag and metal oxide $Fe_2O_3$ nanoparticles exhibited IMC electrochemical sensing behavior. Hematite ore acts as a host matrix with large surface area and adsorption sites, and the meso-C can hinder the aggregation of metal oxide nanoparticles as well as enhance the conductivity of the nanocomposite. In addition, because of the large specific surface area and abundant anchoring sites, the meso-C/hematite ore provides a suitable platform for the deposition of AgNPs, thus enhancing the IMC sensing behavior by reducing the reduction potential. Therefore, the nanocomposite combined the merits of different single components, and displays new properties beyond their single constituents.

Figure 15A:
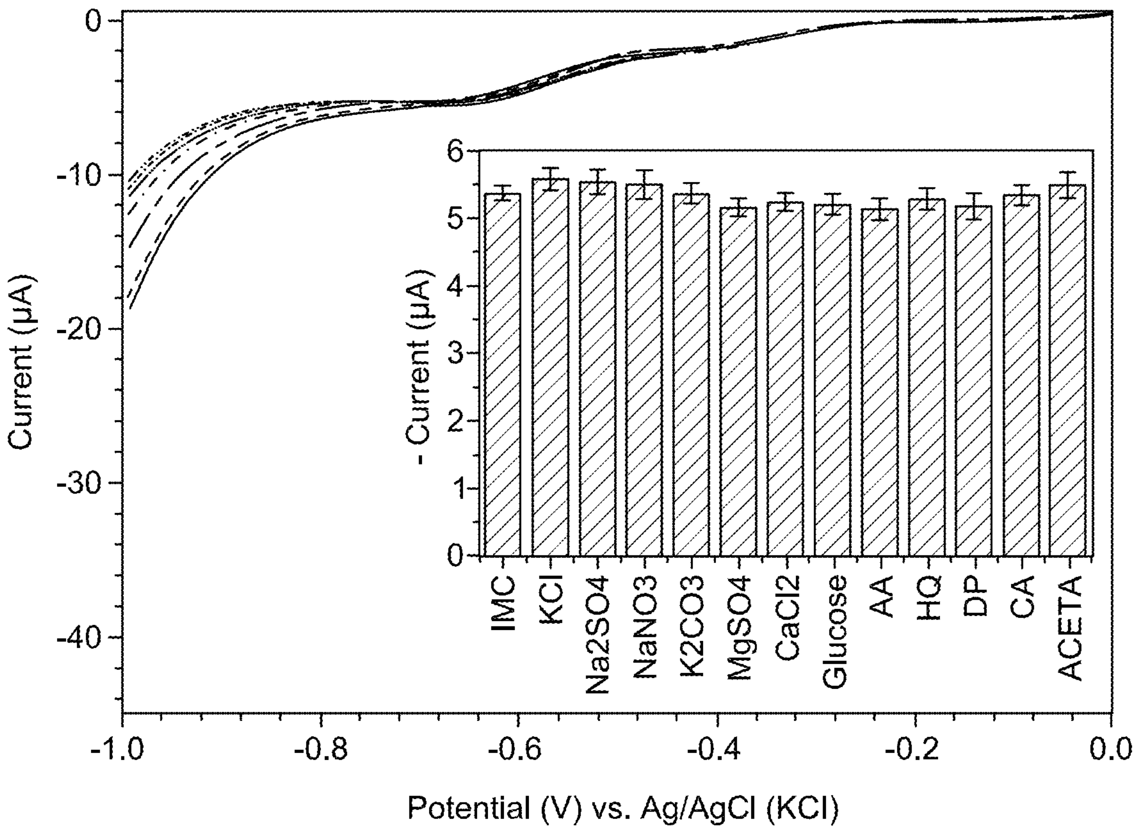
FIG. 15A shows LSV's for a selectivity test of Ag@Meso-C/hematite ore modified glassy carbon (GC) electrode to 0.283 mM IMC in 0.1 M PBS (pH=6.60) at a scan rate of 20 $mVs^{-1}$, according to certain embodiments.
Figure 15B:
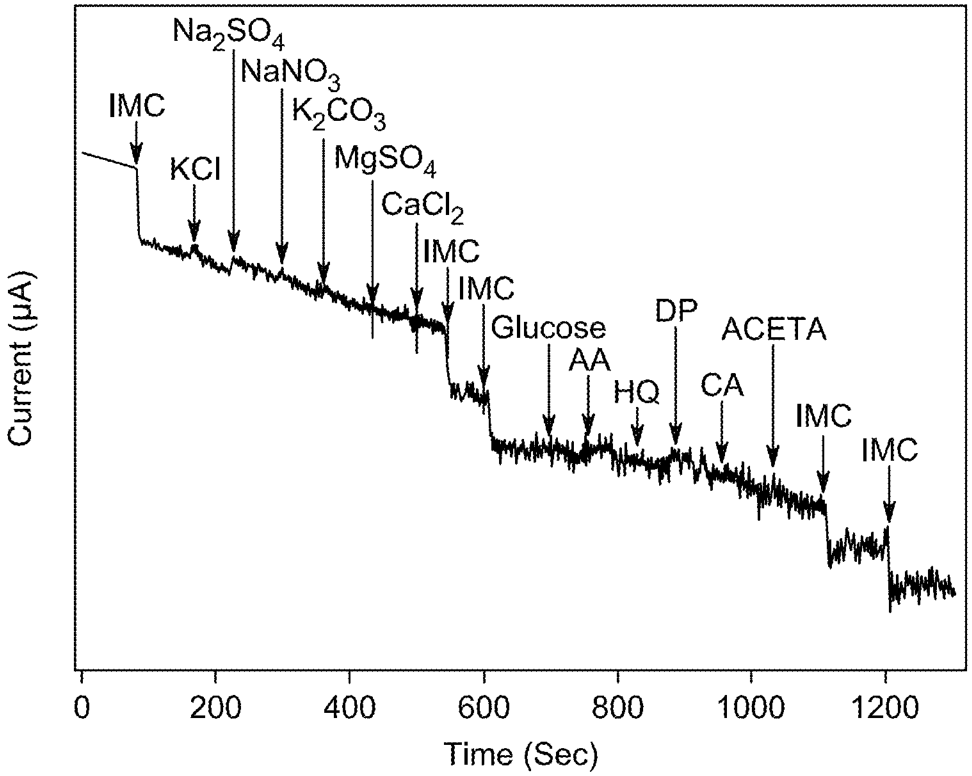
FIG. 15B is a plot depicting an amperometric response of Ag@meso-C/hematite ore/GCE to 63.20 UM IMC and successive addition of interfering species KCl, $Na_2SO_4$, $NaNO_3$, $K_2CO_3$, $MgSO_4$, $CaCl_2$), glucose, and citric acid, according to certain embodiments.

Example 8: Selectivity, Reproducibility, Repeatability, and Operational Stability The selectivity or interference test is a factor for the validation of the sensor for practical use. For this purpose, the selectivity of the electrochemical sensor was determined using the LSV and amperometric techniques (FIG. 15). The effect of potential interference of common interfering species towards IMC detection at detection conditions was examined successively. The interfering species like KCl, $Na_2SO_4$, $NaNO_3$, $K_2CO_3$, $MgSO_4$, $CaCl_2$), glucose and citric acid (CA) were applied three times higher concentration than the target IMC. Whereas, ascorbic acid (AA), hydroquinone (HQ), dopamine (DA), acetamiprid (ACETA) were used as two times higher concentration than IMC. Noteworthy, the IMC concentration was used as 0.283 mM and 63.20 μM for LSV and amperometric investigation, respectively. FIG. 15A shows that the inorganic and organic interfering species did not affect the electrochemical response of LSVs recorded under identical experimental conditions at the scan rate 20 $mVs^{-1}$. This finding confirms that the electrochemical sensor is highly selective towards IMC sensing. In addition, in the amperometric study (FIG. 15B), an instant current response was observed upon the injection of IMC in 0.1 M PBS solution under the previously amperometric conditions, whereas insignificant amperometric response was observed upon the consecutive addition of interfering inorganic and organic species. The reason behind such good selectivity of the sensor electrode may be due to the fact that the reduction potential of those interfering molecules occurs at different potentials apart from the reduction potential of the target analyte IMC. Therefore, it may be concluded that the fabricated electrochemical sensor can be selectively used in the determination of IMC in real samples.

Figure 16:
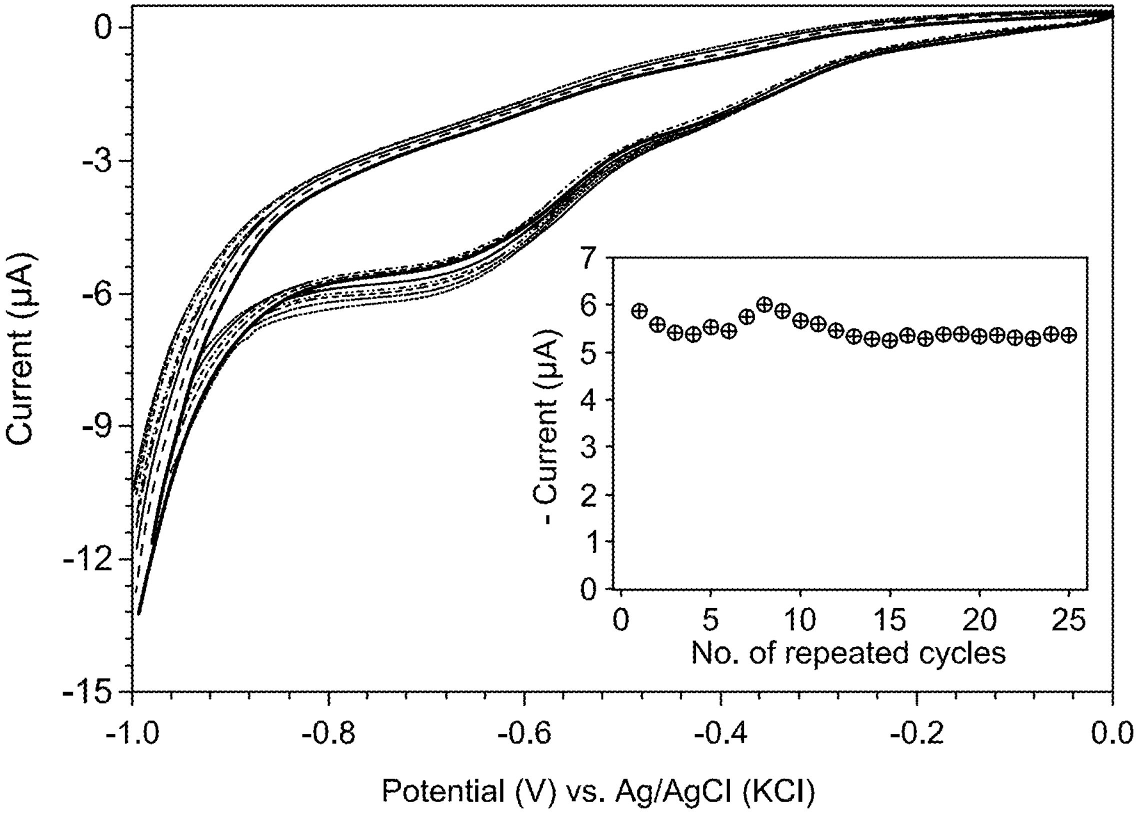
FIG. 16 illustrates a repeatability test of Ag@meso-C/hematite ore using 25 repeated CV cycles in 0.1 M PBS (pH=6.60) containing 0.283 mM of IMC at scan rate 20 $mVs^{-1}$, according to certain embodiments.
Figure 17:
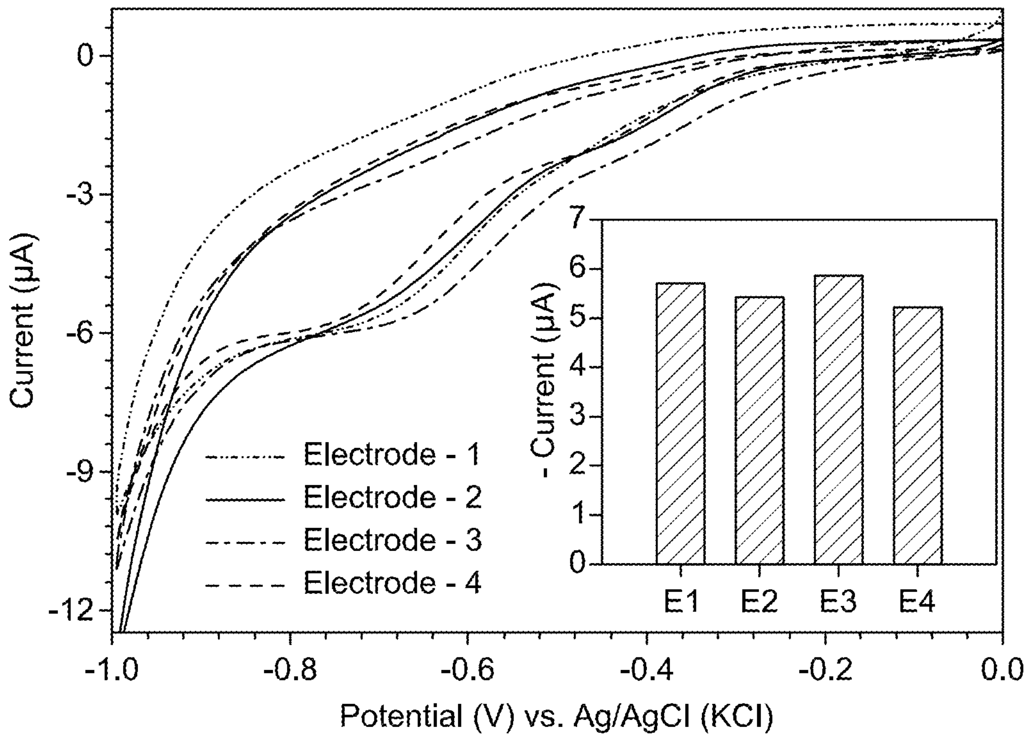
FIG. 17 shows a reproducibility test via measuring voltammograms of four different modified electrodes using Ag@meso-C/hematite ore in 0.1 M PBS (pH=7.0) solution containing 0.283 mM IMC at scan rate 20 $mVs^{-1}$, according to certain embodiments.
Figure 18:
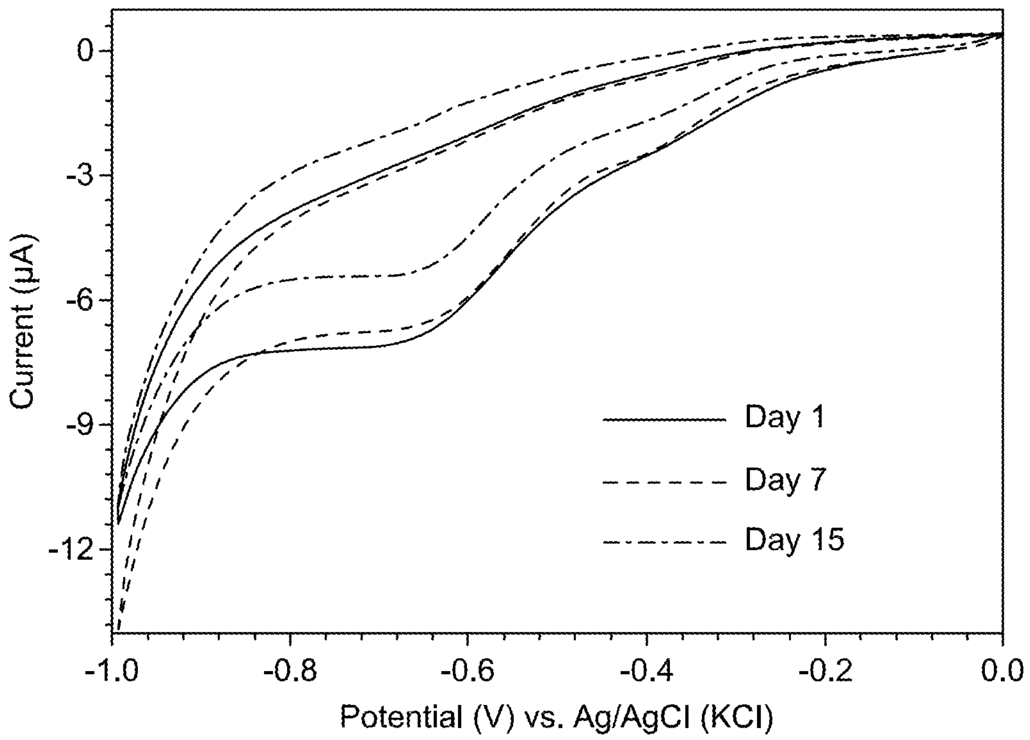
FIG. 18 shows a storage stability test using Ag@meso-C/hematite ore using 0.1 M PBS (pH=6.60) containing 0.283 mM IMC at 20 $mVs^{-1}$ scan rate, according to certain embodiments.

The operational stability and repeatability of the sensor electrode were evaluated using 25 repeated CV cycles. The voltammograms were recorded at 0.283 mM of IMC in 0.1 M PBS (pH=6.60) at the scan rate of 20 $mVs^{-1}$ (FIG. 16). The result reveals that after 25 cycles, the relative standard deviation (% RSD) of peak current (at −0.7 V) is 3.73%. In addition, the reproducibility of the examined sensor electrode was investigated by recording voltammograms of four different modified electrodes under identical experimental conditions, as can be observed in FIG. 17. From the CV response, the % RSD of the current response (at −0.7 V) was found to be 4.45%. Finally, the storage stability of the as-fabricated sensor electrode was examined by storing the electrodes for 15 days in an ambient atmosphere (FIG. 18). After 7 days, almost no change of peak shape and current intensity was observed. However, after 15 days, a decline in the current response was observed and retained ~76% of the initial current intensity value. The decline of the current may be due to the activity loss of the proposed sensor electrode.

Example 9: Real Sample Analysis

The validity of the proposed sensor electrode and the accuracy of the applied electrochemical technique was evaluated by means of IMC recovery test from deep-well water (collected from Najran Velly, Najran, Saudi Arabia). The recovery analysis was done using the standard addition method without any pretreatment of the deep-well water in order to clarify the possible interferences. In both LSV and amperometric approaches, real sample analysis was carried out for different IMC concentrations and each experiment was repeated three times. The current research outcomes revealed that the endurable recovery ranging from 97.65% to 101.07% (for LSV) was achieved, whereas, in case of amperometric test the endurable recovery ca. 102% was obtained (Table 2).

TABLE 1

IMC recovery concentration using linear sweep voltammetry and amperometric techniques in deep-well water sample by the standard addition method.

| Technique | IMC Added (μM) | IMC Found (μM) | Recovery (%) | % RSD | Average Recovery (%) |
|---|---|---|---|---|---|
| Linear Sweep Voltammetry | 103.0 | 99.6 | 96.70 | 7.23 | 101.07 |
| | | 98.0 | 95.15 | | |
| | | 114.7 | 111.36 | | |
| | 197.0 | 194.7 | 98.83 | 1.23 | 97.65 |
| | | 193.3 | 98.12 | | |
| | | 189.0 | 96.0 | | |
| | 283.0 | 275.5 | 97.34 | 3.04 | 98.51 |
| | | 270.5 | 95.58 | | |
| | | 290.4 | 102.62 | | |
| Amperometric | 42.55 | 44.75 | 105.17 | 4.65 | 102.11 |
| | | 40.59 | 95.40 | | |
| | | 44.99 | 105.75 | | |
| | 63.20 | 64.56 | 102.15 | 4.98 | 102.34 |
| | | 60.79 | 96.19 | | |
| | | 68.68 | 108.68 | | |

The experimental results in both techniques are reasonable and within acceptable range (80-110%) according to Association of Official Analytical Collaboration (AOAC) International. The obtained results indicated that the as-fabricated sensor and the applied electrochemical methods could be a method for IMC detection.

The invention claimed is:

1. A method of detecting imidacloprid, comprising:
contacting an electrochemical sensor with a solution;
applying a potential across the electrochemical sensor in the solution;
measuring the current output of the electrochemical sensor; and
determining if the imidacloprid compound is present in the solution based on the current output,
wherein the electrochemical sensor comprises at least one layer of a nanocomposite at least partially coating a surface of a substrate,
wherein the nanocomposite comprises:
silver nanoparticles;
mesoporous carbon; and
hematite ore,
wherein the mesoporous carbon is distributed over the hematite ore to form a composite, and the silver nanoparticles are uniformly distributed over a surface of the composite to form the nanocomposite,
wherein the silver nanoparticles are uniformly distributed over the surface of the composite via charge transfer interactions.

2. The method of claim 1, wherein particles of the hematite ore have a nanorod shape with an average length of 10 nm to 10 μm and an average width of 10-500 nm.

3. The method of claim 1, wherein the hematite ore has $Fe_2O_3$ and $Fe_3O_4$ phases.

4. The method of claim 1, wherein the silver nanoparticles are substantially spherical and have an average diameter of 1-20 nm.

5. The method of claim 1, wherein the mesoporous carbon has a nano-sheet morphology.

6. The method of claim 1, wherein the mesoporous carbon has an average pore diameter of 10-200 Å.

7. The method of claim 1, wherein the mesoporous carbon has a surface area of 100-300 $m^2/g$.

8. The method of claim 1, wherein the silver nanoparticles are not in the pores of the mesoporous carbon.

9. The method of claim 1, wherein the silver nanoparticles are not aggregated.

10. The method of claim 1, wherein particles of the hematite ore are not aggregated.

11. The method of claim 1, wherein the substrate is made from a material selected from the group consisting of glassy carbon, gold, silver, platinum, and boron doped diamond.

12. The method of claim 1, wherein the electrochemical sensor has a reduction potential less than −1.0 V vs Ag/AgCl.

13. The method of claim 1, wherein the electrochemical sensor has a detection limit of the imidacloprid compound of 0.1 to 2 μM.

14. The method of claim 1, wherein the electrochemical sensor selectively detects the imidacloprid compound in the solution.

15. A method of detecting imidacloprid, comprising:
contacting an electrochemical sensor with a solution;
applying a potential across the electrochemical sensor in the solution;
measuring the current output of the electrochemical sensor; and
determining if the imidacloprid compound is present in the solution based on the current output,
wherein the electrochemical sensor comprises at least one layer of a nanocomposite at least partially coating a surface of a substrate, wherein the nanocomposite comprises:
silver nanoparticles;
mesoporous carbon; and
hematite ore,
wherein the mesoporous carbon is distributed over the hematite ore to form a composite, and the silver nanoparticles are uniformly distributed over a surface of the composite to form the nanocomposite,
wherein the nanocomposite comprises 0.1-5 wt % silver nanoparticles, 1-5 wt % mesoporous carbon, and 90-98 wt % hematite ore, based on the total weight of the nanocomposite.

16. A method of detecting imidacloprid, comprising:
contacting an electrochemical sensor with a solution;
applying a potential across the electrochemical sensor in the solution;
measuring the current output of the electrochemical sensor; and
determining if the imidacloprid compound is present in the solution based on the current output,
wherein the electrochemical sensor comprises at least one layer of a nanocomposite at least partially coating a surface of a substrate,
wherein the nanocomposite comprises:
silver nanoparticles;
mesoporous carbon; and
hematite ore,
wherein the mesoporous carbon is distributed over the hematite ore to form a composite, and the silver nanoparticles are uniformly distributed over a surface of the composite to form the nanocomposite,
wherein the nanocomposite comprises 30-50 atomic percent (at %) carbon, 20-40 at % oxygen, 1-5 at % aluminum, 1-5 at % silicon, 15-25 at % iron, and 0.01-2 at % silver based on a total at % of the nanocomposite.

* * * * *